(12) United States Patent
Agarwal et al.

(10) Patent No.: US 12,038,993 B1
(45) Date of Patent: Jul. 16, 2024

(54) TECHNIQUES FOR SHOWING MATCHED URLs FOR A URL GROUPING RULE

(71) Applicant: SPLUNK Inc., San Francisco, CA (US)

(72) Inventors: Umang Agarwal, Berkeley, CA (US);
Gergely Danyi, Cupertino, CA (US);
Khawar Deen, Sunnyvale, CA (US);
Joshua Johnson, Morgan Hill, CA (US); Anusha Konatala, Fremont, CA (US); Rashmi Kalyani Vasudevan, San Francisco, CA (US); John Bennett Wundes, Santa Rosa, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 18/104,218

(22) Filed: Jan. 31, 2023

(51) Int. Cl.
| G06F 15/173 | (2006.01) |
| G06F 11/34 | (2006.01) |
| G06F 16/955 | (2019.01) |
| G06F 16/958 | (2019.01) |

(52) U.S. Cl.
CPC ...... *G06F 16/9566* (2019.01); *G06F 11/3409* (2013.01); *G06F 16/958* (2019.01)

(58) Field of Classification Search
None
See application file for complete search history.

(56) References Cited

U.S. PATENT DOCUMENTS

| 7,680,773 | B1* | 3/2010 | Acharya | G06F 16/951 709/219 |
| 7,937,344 | B2 | 5/2011 | Baum et al. | |
| 8,112,425 | B2 | 2/2012 | Baum et al. | |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 9,602,573 | B1* | 3/2017 | Abu-Ghazaleh | H04L 67/02 |
| 10,127,258 | B2 | 11/2018 | Lamas et al. | |
| 10,305,758 | B1* | 5/2019 | Bhide | G06F 11/3409 |
| 10,505,825 | B1* | 12/2019 | Bettaiah | G06F 16/285 |
| 10,671,520 | B1* | 6/2020 | Rodrigues | H04L 43/08 |

(Continued)

OTHER PUBLICATIONS

Splunk Enterprise 8.0.0 Overview, available online, retrieved May 20, 2020 from docs.splunk.com.

(Continued)

*Primary Examiner* — Phuoc H Nguyen
(74) *Attorney, Agent, or Firm* — Kilpatrick Townend & Stockton LLP

(57) ABSTRACT

A performance monitoring system (PMS 102) displays a list of example URLs that matched a URL grouping rule used to group URLs. For a rule configured for a customer of the PMS, the example matched URLs are selected by the PMS from a candidate set of URLs identified from data associated with that customer. The PMS receives information identifying a Uniform Resource Locator (URL) grouping rule displayed in a graphical user interface (GUI). The PMS identified a list of candidate URLs occurring in the stored data. The PMS then identifies, from the list of candidate URLs, a set of matched URLs, the set of matched URLs including one or more URLs from the list of candidate URLs that matched the URL grouping rule. The PMS then causes at least one URL from the set of matched URLs to be displayed on the GUI.

17 Claims, 16 Drawing Sheets

(56) References Cited

U.S. PATENT DOCUMENTS

| | | | |
|---|---|---|---|
| 11,397,789 B1 | 7/2022 | Clemmensen et al. | |
| 11,729,782 B2* | 8/2023 | Zhang | H04W 52/242 |
| | | | 370/336 |
| 2008/0133540 A1* | 6/2008 | Hubbard | H04L 63/145 |
| 2011/0161336 A1* | 6/2011 | Shiga | G06F 16/951 |
| | | | 707/758 |
| 2011/0167063 A1* | 7/2011 | Tengli | G06F 16/7343 |
| | | | 707/E17.089 |
| 2012/0290950 A1* | 11/2012 | Rapaport | H04L 12/1818 |
| | | | 715/753 |
| 2013/0215789 A1* | 8/2013 | Lim | H04L 12/1877 |
| | | | 370/254 |
| 2014/0214790 A1* | 7/2014 | Vaish | G06F 16/93 |
| | | | 707/709 |
| 2019/0098106 A1 | 3/2019 | Mungel et al. | |
| 2019/0361940 A1* | 11/2019 | Rogynskyy | G06F 16/285 |
| 2022/0272109 A1* | 8/2022 | Szurdi | H04L 63/1416 |
| 2022/0353153 A1* | 11/2022 | Costante | G06N 20/00 |
| 2023/0040365 A1* | 2/2023 | Raleigh | H04W 28/0257 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

TECHNIQUES FOR SHOWING MATCHED URLs FOR A URL GROUPING RULE

CROSS-REFERENCES TO RELATED APPLICATIONS

The present disclosure is related to the following applications. The entire contents of each of the following applications are incorporated herein by reference for all purposes:
(1) U.S. application Ser. No. 18/104,216 filed concurrently with the present application, titled TECHNIQUES FOR GROUPING URLS; and
(2) U.S. application Ser. No. 17/245,786 filed Apr. 30, 2021, titled URL NORMALIZATION FOR RENDERING A SERVICE GRAPH AND AGGREGATING METRICS ASSOCIATED WITH A REAL USER SESSION, now allowed.

RELEVANT FIELD

The present disclosure relates to performance monitoring of resources (e.g., websites, web pages, applications, cloud services) accessible using Uniform Resource Locators (URLs). More specifically, innovative techniques are described that enable users to specify customized URL grouping rules for organizing URLs into groups, wherein each URL grouping rule is directed to a specific component of a URL. The URL component-specific grouping rules described herein provide a better way of grouping URLs, and the metrics computed for the URL grouping rules provide for enhanced performance monitoring of resources accessed using URLs.

BACKGROUND

A Uniform Resource Locator (URL) identifies an address that can be used to locate a resource (or endpoint) in a distributed network such as the Internet. The resource pointed to by a URL is typically accessed via a program such as a browser. A user can input a URL corresponding to a resource to be accessed to the browser or may select a link (e.g., click a link) corresponding to the resource, and in response, the browser is configured to locate the resource and provide the user access to the resource via the browser. For example, a user may request a webpage by providing a URL for the webpage to the browser. The browser responds by accessing the requested webpage and displaying it to the user. A resource addressed by a URL is typically stored on a computer system that is remote from the computer system executing the browser.

The types of resources that can be located or accessed via URLs include websites, webpages, applications, documents, and other content. With the popularity of cloud services, URLs are also now used to access cloud services provided by one or more cloud service providers (CSPs).

Providers of web resources pointed to by URLs typically collect data related to user interactions with the resources using the URLs. This data can be collected over a time period as a time series, such as every minute, hour, day, week, month, etc. Performance monitoring systems are then configured to analyze the collected data and collect performance metrics for the web resources, associated URLs, and the systems hosting the web resources.

For example, for a URL pointing to a website, data may be collected related to users' interactions with the website via the URL. The collected data may include, for example, for each URL interaction: a browser that was used to access the resource using the URL, information about the user accessing the resource (e.g., user identity, user location), information about transactions performed using the URL, latency associated with webpages served from the website, webpages accessed from the website, and the like. The collected data may then be used to determine performance metrics for the website, such as average latency experienced by the website's viewers over some time period, number of network errors, location of the top "X" percentile of users, and the like. As another example, data may be collected for and metrics computed for a URL used to access an application (e.g., a web application). As yet another example, data can be collected for URLs used to access applications of cloud services based upon a microservices architecture. The data collected for the URLs can be used to determine the performance of such an application or cloud service based upon the users' page level interactions.

The performance metrics determined for a resource associated with a URL are important for monitoring and maintaining the performance of the resources and for identifying error conditions. For example, for an online retailer selling products via a website accessed using a set of URLs, it is particularly important for the retailer to know the average latency experienced by users accessing the retailer's website from different geographical locations. High latency can result in a bad user experience and drive users (who are potential customers of the online retailer) away from the website and adversely impact the retailer's business. Performance engineers of the retailer may use the collected data and the associated computed performance metrics to make changes to the retailer's infrastructure that supports the website to enhance the website's performance.

There are however several technical challenges to performing the data collection and metrics calculation described above. One of the challenges associated with performance monitoring, for example, is providing a developer of a website or cloud-based application, end-to-end visibility into the performance of the website or application for troubleshooting purposes. Providing a unified view that allows for end-to-end performance visibility is challenging, in part, because of the significant amounts of data (e.g., data related to thousands or millions or even more of traces and associated spans, etc.) generated by both the frontend (e.g., the website, webpages) or the backend (e.g., a set of computer systems hosting the website, one or two databases storing data for the website) for the website or application, and generating performance metrics efficiently that provide a performance engineer with insights into the performance of a website or application and enable the performance engineer to detect and possibly correct problematic conditions associated with the website or application. For example, collecting data and providing performance metrics for browser performance, network performance, erroneous processes, failing services, etc.

Another challenge with respect to performance monitoring is providing the means for efficiently ingesting the collected data, aggregating and organizing the collected data (e.g., aggregating significant amounts of span and trace data received from various different sources), identifying which metrics would be meaningful for performance monitoring and problem detection, generating those metrics, and providing the metrics to the performance engineers in a timely manner. Traditional monitoring and troubleshooting tools, designed as symptom-based solutions with single purpose capabilities, are simply unable to keep up with tracking the performance of dynamic cloud-native applications and analyzing the significant amounts of span and trace data they generate.

In many use cases, instead of monitoring metrics on a per-URL basis, it is more insightful for performance engineers to monitor metrics for groups of URLs. URL grouping thus plays a significant role in performance monitoring. To enable such groupings, performance monitoring systems need to provide tools that enable users of the systems (e.g., performance engineers) to, in a simple and easy manner, specify how URLs included in their collected data are to be grouped and organized. Existing tools provided by performance monitoring systems are inadequate in providing the level of flexibility and simplicity desired by users. Some performance monitoring systems nowadays use machine learning (ML) based techniques for URLs grouping. But existing ML-based solutions miss the mark. Many of the ML-based solutions are not stable and produce erratic results. For URL grouping and associated metrics to be meaningful, the grouping needs to consider the system architecture involved, which is best conveyed by the humans that designed it. It is thus important for humans (e.g., system designers and performance engineers) to be able to control the URL grouping. The ML-based solutions take this control away from these engineers and performance engineers. They are left with little control over how the URLs are grouped and organized.

DETAILED DESCRIPTION

Figure 1:
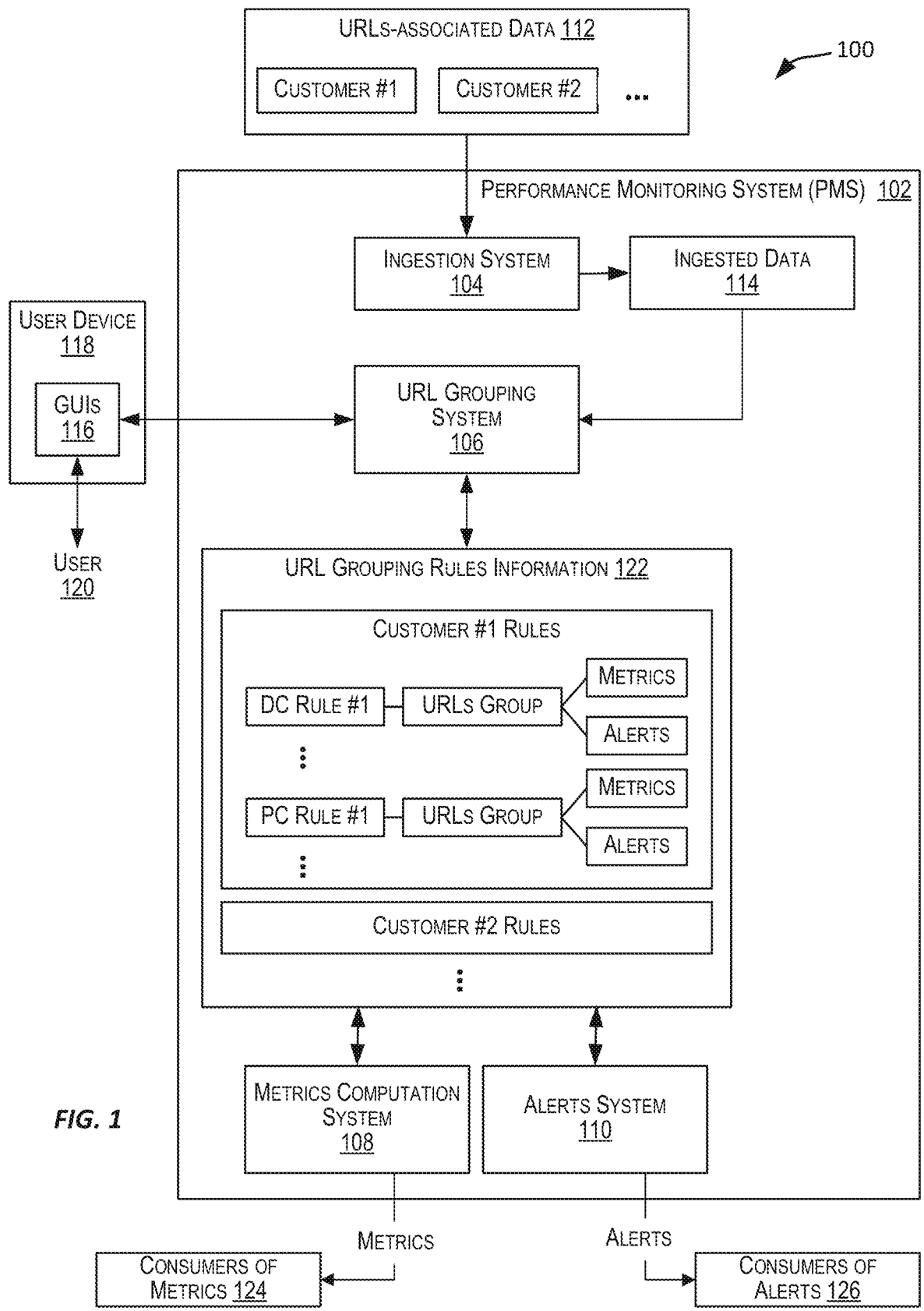
FIG. 1 is a simplified block diagram of a distributed environment incorporating a performance monitoring system (PMS) according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to performance monitoring of resources (e.g., websites, web pages, applications, cloud services) accessible using Uniform Resource Locators (URLs). More specifically, innovative techniques are described that enable users to specify customized URL grouping rules for organizing URLs into groups, wherein each URL grouping rule is directed to a specific component of a URL. The URL component-specific grouping rules described herein provide a better way of grouping URLs, and the metrics computed for the URL grouping rules provide for enhanced performance monitoring of resources accessed using URLs.

The present disclosure relates to performance monitoring systems, and more particularly to improved techniques for grouping Uniform Resource Locators (URLs) that are used to access resources such as websites, web pages, applications, cloud services, etc. Innovative techniques are described that enable users to specify customized rules (referred to as URL grouping rules) for organizing URLs into groups. Instead of defining a rule for the entire URL, the novel techniques described in this disclosure enable a user to first select a component of a URL to which the URL grouping rule is to be targeted and then provide a rule that is specific for the user-selected component of the URL. For example, a user can select the domain component of a URL and then author a rule directed solely to the domain component. As another example, a user can select the path component of a URL and then author a rule directed solely to the path component. The performance metrics generated for the URLs group facilitate enhanced performance monitoring of the resources pointed to by the URLs.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

This disclosure describes novel techniques that enable users to specify customized URL grouping rules for grouping URLs and URLs-associated data. A performance monitoring system (PMS) is disclosed that provides a set of graphical user interfaces (GUIs) that enable a user of the PMS to first select a specific component of a URL, and then input a customized URL grouping rule directed or targeted solely to that selected URL component.

A typical URL includes multiple parts or components such as a scheme component, a domain component (also referred to as the host component), a path component, and the like. The domain component can, in turn, include a subdomain component, a domain name component, and a top-level domain (TLD) component. The path component can include a query component, a fragment component, and the like.

In certain implementations, the PMS provides GUIs that display information identifying a list of multiple components of a URL that a user can select from. The GUIs enable the user to select one particular URL component from the list of URL components. The GUIs further enable the user to input a URL grouping rule that is directed solely to the selected component of the URL. For example, the GUI may enable selection between a domain component and a path component of a URL. Upon selecting the domain component, the user can then, via the GUI, enter a URL grouping rule directed to the domain component. Such a rule directed solely to the domain component of a URL is also referred to as a domain component URL grouping rule or a domain component rule. The domain component URL grouping rule specifies a pattern that is used by the PMS for finding matches between URLs and the domain component rule. If the user instead selects the path component, the user can then, via the GUI, enter a URL grouping rule directed solely to the path component. Such a rule directed solely to the path component of a URL is also referred to as a path component URL grouping rule or path component rule. The domain component URL grouping rule specifies a pattern that is used by the PMS for finding matches between URLs and the domain component rule. The user can specify one or multiple domain component rules and one or more path component rules. In this manner, the GUIs provided by the PMS allow a user to specify a rule and associated pattern targeting a specific component of a URL independently from the other components of the URL.

The term "URL component rule" is used in this disclosure as a generic term to refer to a URL grouping rule that is directed to a particular component of a URL. Domain component rules and path component rules are examples of URL component rules.

In certain implementations, the list of URL components that the user can select from are non-overlapping components of the URL, i.e., there is no overlap between the components. An example of such non-overlapping components are a scheme component, a domain component, and a path component. In other implementations, the list of URL components that the user can select from can include some overlapping components of the URL. For example, the list can include a domain component and also a subdomain component.

For purposes of this disclosure, a user is a person who uses the GUIs provided by the PMS and inputs or authors URL grouping rules. One or more users can be associated with a customer of the PMS. These users may author URL grouping rules for the customer. These rules are used to organize the URLs occurring in data received by the PMS for that customer for purposes of performance monitoring in associations with one or more resources (e.g., applications, websites, webpages) provided by the customer.

The GUIs provided by the PMS also enable the ability to specify various other aspects for a URL component rule. For example, the GUIs enable the author of the URL component rule to specify the scope of the rule. The rule can be scoped to "all applications" or certain selected applications. For example, if the URL component rule is for a customer of the PMS 102, the user authoring the rule can set the scope of the rule to all applications associated with the customer and for which the PMS receives data that is used for performance monitoring of the applications. Alternatively, the scope of a rule can be constrained to less than all the applications—to specific applications selected by the user. The scope associated with a rule is used by the PMS when pattern matching is performed between the rule and a URL occurring in the customer's data. Information is associated with the URL identifying an application associated with the URL. The PMS performs pattern matching between a rule and a URL only if the application (or resource, in general) associated with the URL is included within the scope of the applications associated with the URL grouping rule.

When a path component of a URL is selected as the target for a URL grouping rule, the GUIs provided by the PMS also enable the author of the rule to specify whether the path component being authored is to apply to single-page applications, and whether the pattern matching for the rule is to be performed in a case-sensitive or case-insensitive manner (this is the default for certain embodiments).

In certain implementations, the PMS receives rules information authored by a user and then creates a new corresponding URL component rule. The PMS also creates a URLs group for that rule. A URLs group associated with a URL grouping rule is used to store and organize all URLs that are determined by the PMS to match the URL grouping rule. As part of the processing to determine whether a URL matches the URL grouping rule, the PMS performs pattern matching between the URL and the pattern corresponding to the URL grouping rule. If the URL is determined to match the pattern and thus match the rule, the matched URL is added to the URLs group for that URL grouping rule. A URL can match zero, one, or more URL grouping rules, and can thus be grouped in zero, one, or multiple URL groups corresponding to the matched rules. The URLs group for a URL grouping rule includes all URLs that are determined by the PMS to match the rule.

A single URL can match multiple rules and thus get added to multiple URL groups corresponding to the matched rules. For example, a URL can match both a URL grouping rule directed to a domain component and a URL grouping rule directed to a rule directed to a path component. Further, the URL can match multiple domain component rules and/or multiple path component rules.

As mentioned in the Background section, in many use cases, instead of monitoring metrics on a per-URL basis, it is more insightful for performance engineers to monitor metrics for groups of URLs. The URL component rules enable URLs to be organized into groups of URLs. For example, each URL component rule has an associated URLs group that includes URLs that match the rule. PMS is further configured to compute a set of one or more performance metrics for each URL grouping rule. The performance metrics for a URL grouping rule are based upon data associated with the URLs in the URLs group for that URL grouping rule. For example, as part of computing a metric value for a URL grouping rule, the PMS determines the one or more matched URLs in the URLs group for that URL grouping rule, determines a metric value for each URL in the URLs group based upon data associated with that URL, and then computes an aggregate metric value for the URL grouping rule based upon the metric values computed for the URLs in the URLs group for the URL grouping rule. The PMS may then provide the metrics for the URL grouping rules to one or more consumers (e.g., performance engineers) of the metrics. The performance metrics generated for the URL grouping rules facilitate enhanced performance monitoring of the resources pointed to by the URLs.

The PMS also enables alerts to be associated with one or more URL grouping rules. One or more alerts may be configured for a URL grouping rule. The PMS includes an alerts system that is configured to manage these alerts. In certain embodiments, an alert may be tied to one or more performance metrics computed for a URL grouping rule.

The various features provided by the PMS for URL grouping rules, as described in this disclosure, provide several technical benefits over existing techniques. As described in the Background sections, several performance monitoring tools use ML-based techniques for URLs normalization and grouping. These ML-based solutions have several problems. The ML model has to be first trained until an acceptable performance level is obtained. The training of a ML model is however only as good as the training data that is used to train the model. Many times, this training data is not available. Further, the training data typically has to be provided by users or customers of the performance monitoring system and this is burdensome for the users and customers. Most importantly, existing performance monitoring systems that use ML-based grouping solutions leave the user with no (or minimal) control over how the URLs grouping is performed. Many times, users and customers of a performance monitoring system are deeply knowledgeable about their systems being monitored and associated URLs and may want to customize and/or influence how URLs grouping is performed by the performance monitoring system. There is no easy and convenient way for them to do this in existing ML-based solutions. Currently, the user has to contact a provider of the PMS and request a particular user-customized way of grouping URLs to be implemented. This all takes a long turn-around time to implement, and many times the model still performs erratically and does not deterministically create URL groups as desired by the user.

The various embodiments and teachings described herein do not suffer from the various problems described above. The PMS allows users to have complete control and flexibility in the way URL grouping rules are defined. This is a significant improvement over several previously used techniques for organizing URLs. Enabling the user to select a particular URL component and then allowing the user to author a URL grouping rule that is directed solely to that user-selected URL component not only simplifies the rules-authoring process for the user but also enables grouping of URLs to be performed in a more intuitive and relevant manner for users and customer of the PMS. For an organization that is a customer of services provided by the PMS, customizing rules directed to specific components of a URL streamlines the organization of data for that organization in a way and manner that is relevant to and makes most sense for the organization.

The rules-authoring process is simplified for the user. By selecting and targeting specific components (e.g., domain component, path component) of a URL, users of the PMS can concentrate on specific concepts by which the users desire to have URLs information organized and metrics generated. For example, when authoring a domain component rule, the user can concentrate purely on the sub-domain, domain name, or top-level domain (TLD) portion of the domain component and what the use would like to mark as a "don't care" so that it can be wildcarded in the document rule. While specifying such a domain component, the user does not have to worry about the other components of the URL, and this significantly simplifies the thought process of organizing URLs and URLs-associated data that is received by the PMS, and which has to be analyzed by the PMS to determine performance metrics associated with the data.

Likewise, when authoring a path component, the rules author can concentrate on parts of the path component that are relevant to or alternatively not relevant to the user. For example, an organization interested in comparing the performance of different versions of their website or application may customize path component rules to group URLs based upon the version number occurring in the path component of the URLs. The PMS then groups all URLs for one software version in one group corresponding to a path component rule targeting the first version, and groups all URLs for a different software version in a second group associated with a path component targeting the second version. The PMS 102 may then compute performance metrics for each of the path component rules. The organization may then compare these performance metrics for the two URL grouping rules to compare the performance of the software versions. The URL components-based rule making thus significantly simplifies the specification of such URL component rules.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

The PMS also provides additional tools and techniques to assist users in authoring URL grouping rules. In certain implementations, the PMS displays a list of example URLs that matched a URL grouping rule. For a rule configured for a customer of the PMS, the example matched URLs are selected by the PMS from a candidate set of URLs identified from data associated with that customer. Accordingly, the examples that are displayed are URLs occurring in the customer's own data. The example matched URLs that are displayed help a user to easily and readily determine whether a URL grouping rule has been correctly specified or if there is an error. For example, for a particular URL grouping rule, if the example matched URLs that are displayed for the rule do not match the URLs expected by the user to match the rule, then it may indicate an error in the URL grouping rule itself. Upon identifying the error, the user can immediately edit the rule and make any corrections. A user authoring a rule can also try out different versions of the rule and, for each version, check the example matched URLs that are displayed for each version of the rule. In this manner, displaying the example matched URLs enables the user to make changes as desired and get instant feedback through the example matched URLs that are displayed for the rule. This significantly helps users to enter correct URL grouping rules.

FIG. 1 is a simplified block diagram of a distributed environment 100 incorporating a performance monitoring system (PMS) 102 according to certain embodiments. Distributed environment 100 may comprise multiple systems communicatively coupled to each other via one or more communication networks. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems.

The systems and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device). In certain implementations, PMS 102 may be implemented using one or more computer systems, each computer system comprising one or more processors that are capable of executing code and computer-readable instructions, which may be stored on non-transitory storage media. The computing systems used for implementing PMS 102 can be server class systems with powerful processors, large memory resources, and fast input/output systems.

PMS 102 is configured to provide performance monitoring services for multiple customers. For a user or customer, PMS 102 may monitor the performance of one or more resources of the customer or user. A customer can be an entity such as an organization, a company, an educational institution, and the like. The resources monitored by PMS 102 may include applications, websites, webpages, and the like. PMS 102 may perform the performance monitoring based upon URLs-associated data 112 received by PMS 102 for various customers. As shown in FIG. 1, the URLs-associated data 112 may include data corresponding to various different users or customers such as "Customer #1," "Customer #2, etc. for a particular customer, PMS 102 may use the URLs-associated data 112 received by PMS 102 for that customer to perform performance monitoring of one or more resources (e.g., applications, websites) for the customer.

PMS 102 may perform different types of performance monitoring. For example, PMS 102 may perform application performance monitoring (APM) that involves not only monitoring the services deployed on the backend of a cloud computing environment but also monitoring service quality delivered by, for example, the frontend or user interface of an application or website (e.g., for a SaaS application). An important aspect of APM involves gauging user experience, including key metrics such as the load time of a particular website or visualization.

PMS 102 may also perform Real User Monitoring (RUM) (also referred to as real user measurement or end-user experiencing monitoring) which is a type of passive performance monitoring that captures and analyzes each transaction by users of a website or an application (e.g., a cloud-based microservices-based application). Monitoring actual user interaction with a website or an application is important to operators (e.g., site reliability engineering teams or developer teams of a website or a cloud-based application) to determine if users are being served quickly and without errors and, if not, which part of a process is failing. SaaS and application service providers use RUM to monitor and manage service quality delivered to their clients and to detect errors or slowdowns on web sites. The data may also be used to determine if changes that are propagated to websites or cloud-based applications have the intended effect or cause errors.

While distinct from the methodologies employed for APM, real user monitoring (RUM) is considered one of the critical strategies employed for performance monitoring by focusing on the manner in which end users' experiences might inform application optimization strategies. RUM surfaces meaningful diagnostic information on frontend performance so developers can optimize frontend code and deliver the best possible user experience. APM meanwhile typically monitors the performance of server-side code and offers detailed insight on improving it to reduce infrastructure costs and creating faster applications for users.

RUM utilizes data related to the end users' experiences to help developers track and improve a website or application's performance. RUM focuses on measuring the experience of real users of a website or an application. It does this by tracking and reporting on several metrics including time-to-first-byte, full page load time, load time of specific elements, DNS timing, transaction paths, JavaScript errors, etc. With RUM, real end-user data can be tracked across browser versions, operating systems, and end-user configurations. Tracking real users allows RUM to provide critical real-world measurements and helps developers identify whether certain user engagements or activities are triggering a lag in performance or causing errors. RUM, therefore, contributes to successful performance monitoring by analyzing how the end users' experiences might inform application-optimization strategies.

RUM-based and APM-based methods together monitor the speed at which both frontend and backend transactions are performed both by end-users and by the systems and network infrastructure that support a software application, providing an overview of potential bottlenecks and service interruptions. This typically involves the use of a suite of software tools—or a single integrated SaaS or on-premises tool—to view and diagnose an application's speed, reliability, and other performance metrics to maintain an optimal level of service.

In the example depicted in FIG. 1, PMS 102 comprises multiple systems that are communicatively coupled with each other. These systems may cooperatively perform processing to enable the functions performed by PMS 102. In the embodiment depicted in FIG. 1, PMS 102 includes an ingestion system 104, a URL grouping system (UGS) 106, a metrics computation system 108, and an alerts system 110. The systems may be implemented in software (e.g., code, instructions, program) executed by one or more processing units (e.g., processors, cores), using hardware, or combinations thereof.

Ingestion system 104 is responsible for ingestion of data received by PMS 102. For example, URLs-associated data 112 received by PMS 102 may be processed by ingestion system 104 and stored as ingested data 114. Ingested data 114 may be stored in non-volatile memory storage. In certain implementations, ingested data 114 represents full fidelity data received by PMS 102. The ingested data 114 may be stored such that it is accessible to the various systems of PMS 102.

URLs-associated data 112 received by PMS 102 may include diverse types of data related to an application, website, or other resource being monitored. In certain embodiments, data 112 can include logs, and data generated from distributed tracing (e.g., span data and trace data). For example, data 112 can include enormous amounts of span and trace data generated by various frontend websites or applications and also backend services in an application owner's architecture. Distributed tracing, also called distributed request tracing, is an application performance monitoring (APM) method used to profile and monitor applications, especially those built using a microservices architecture. Distributed tracing helps pinpoint where failures occur and what causes inferior performance. Distributed tracing, as the name implies, involves tracing user requests through applications that are distributed. A trace represents a single user request, also referred to as a transaction, and represents the entire lifecycle of a request as it traverses across the various services or components of a distributed system.

The term "trace" as used herein generally refers to a record of the manner in which a single user request, also referred to as a transaction, propagates from one microservice (hereinafter interchangeably referred to as "service") to the next in a distributed application. A transaction is described as an end-to-end request-response flow, from the making of the user's initial request to receiving the final response. A transaction often involves the interaction of multiple services. A trace is a record of a transaction, and each trace may be identified using a unique trace identifier ("Trace ID"). The trace follows the course of a request or transaction from its source to its ultimate destination in a distributed system. In one implementation, a trace may be conceptualized as a highly dimensional structured log that captures the full graph of user-generated and background request execution within an application and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the client instrumenting the software, a document involved in the request, an infrastructure element used in servicing a request, etc.

A "root span" refers to the first span in a trace. A span without a parent is called a root span. A "child span" refers to a span that follows a root span, including a child of a child. A "parent span" refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

Distributed tracing data is generated through the instrumentation of browsers, microservices-based applications, libraries, and frameworks. Software may be instrumented to emit spans and traces. The spans and traces may be generated according to an industry standard, such as the OpenTracing standard. Other common open-source instrumentation specifications include OPENTELEMETRY and OpenCensus. Each span may be annotated with one or more tags that provide context about the execution, such as the client instrumenting the software, a document involved in the request, an infrastructure element used in servicing a request, etc.

UGS 106 is responsible for performing grouping of URLs. UGS 106 is responsible for enabling URL component-specific grouping rules to be authored, and further the use and management of URL grouping rules, as described in this disclosure. Functions performed by UGS 106 include generating and managing various GUIs 116 that enable users to author customized URL-component specific grouping rules. For example, GUIs 116 may generate and manage the various GUIs depicted in FIGS. 4A, 4B, 5, 6, 7, 10, 11, and 13, and described below in more detail. UGS 106 may cause these GUIs to be displayed on output devices associated with user devices 118 that users 120 may use to interact with the GUIs. GUIs 116 may include GUIs such as a GUI that enables a user to create a new URL grouping rule (e.g., GUIs depicted in FIGS. 4A, 4B, 5, and 6), GUIs for managing and listing URL grouping rules created for a customer (e.g., GUI depicted in FIG. 7), and GUIs including windows for displaying example matched URLs (e.g., GUIs depicted in FIGS. 10, 11, and 13).

In a typical scenario, UGS 106 may receive a request from a user device 118 requesting a particular GUI. UGS 106 may then send the requested GUI to the requesting user device where the GUI is displayed on an output device (e.g., screen, monitor) of the user device. For example, UGS 106 may receive a request for a GUI for creating a new URL grouping rule (e.g., GUI 400 depicted in FIG. 4A). UGS 106 may then respond and cause the requested GUI to be displayed by the requesting user device. A user 120 may then author and create new customized URL grouping rules via these GUIs, as described below in more detail.

UGS 106 is also responsible for storing and managing URL grouping rules related information 122 received for various customers and users. As shown in FIG. 1, URL grouping rule information 122 may include URL grouping rule information for various customers such as for Customer #1, Customer #2, and the like. For a customer, the URL grouping rules information stored for that customer may include information related to one or more domain component rules (e.g., DC Rule #1 in FIG. 1) and/or one or more path component rules. For each URL grouping rule, the stored information may also include other information such as information identifying the applications to which the rule can be applied. For a customer, a URL grouping rule can be scoped to all applications being monitored for that customer or to some smaller subset of applications. For each path component rule, the information stored may include information indicative of whether the rule is to apply to single-page applications, whether the pattern matching for the rule is to be performed in a case-insensitive or case-sensitive manner, and other information.

As shown in FIG. 1, UGS 106 creates a URLs group for each URL grouping rule. The URLs group associated with a URL grouping rule provides a repository for storing and grouping URLs that match the pattern corresponding to that rule.

Figure 9:
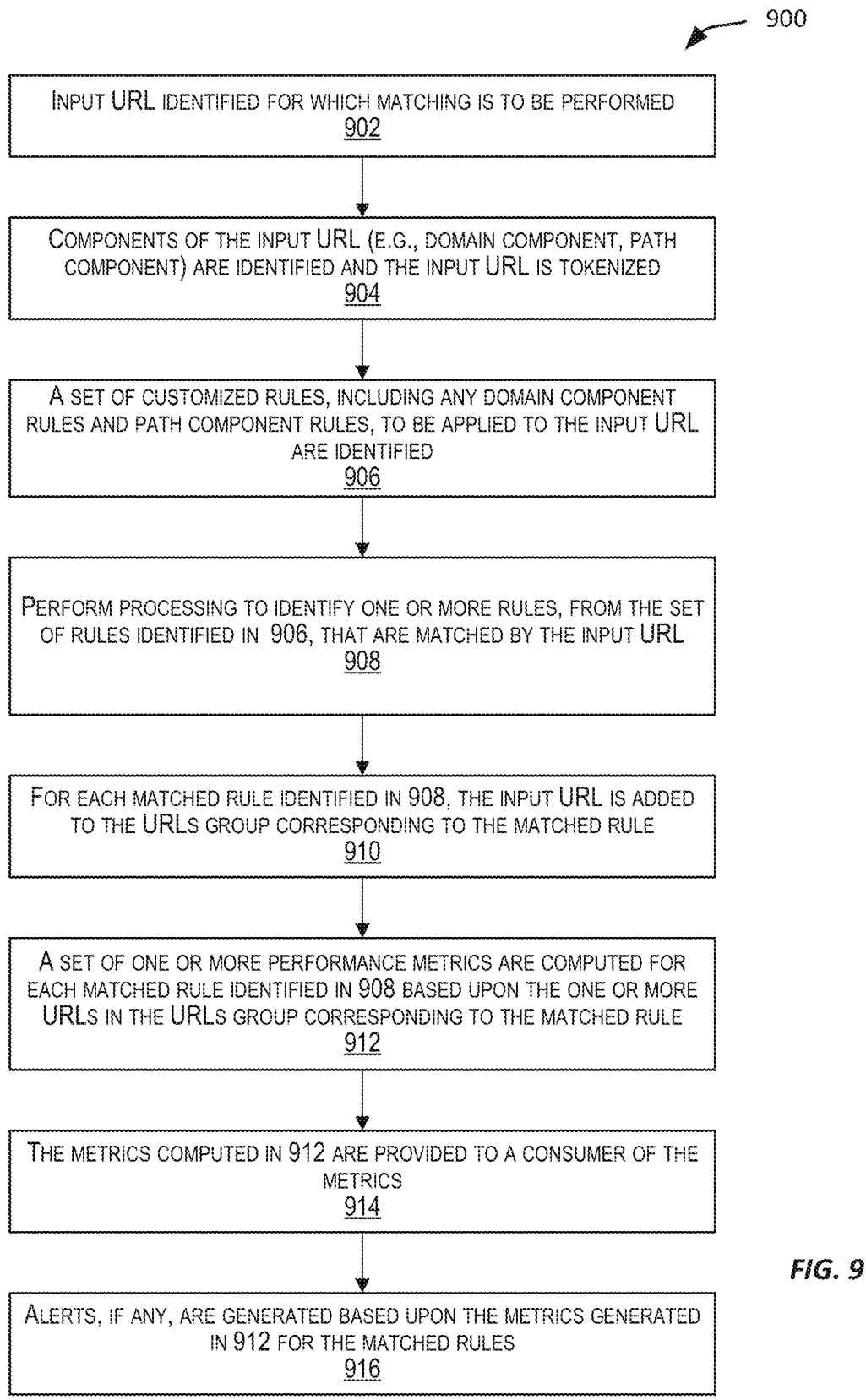
FIG. 9 depicts a simplified flowchart showing processing performed by a PMS for matching URLs to customized URL grouping rules directed to specific components of a URL according to certain embodiments.

UGS 106 is configured to organize the URLs and associated data occurring in the URLs-associated data 112 for a customer based upon the URL grouping rules configured for that customer. For a URL occurring in the customer's data, UGS 106 performs pattern matching to determine if the URL matches any of the domain component rules or path component rules configured for the customer. When a URL matches a URL grouping rule, the URL is added to the URLs group associated with that rule. A URL may match to zero, one, or multiple URL grouping rules. The URLs group associated with a URL grouping rule thus includes all URLs that matched that rule, i.e., matched the pattern corresponding to that rule. Further details related to pattern matching performed by UGS 106 are depicted in FIG. 9 and described below.

Metrics computation system 108 is configured to compute one or more performance metrics for each URL grouping rule. In certain implementations, after UGS 106 has created a new URL grouping rule and its associated URLs group, it informs metrics computation system 108 about the newly created URL grouping rule and requests metrics computation system 108 to initiate the computation of one or more performance metrics for the newly created URL grouping rule. Metrics computation system 108 then initiates computation of performance metrics for the URL grouping rule. In certain implementations, metrics computation system 108 computes a performance metric for a URL grouping rule based upon URLs that have matched to the rule, i.e., URLs that have been added to the URLs groups for the rule. For each URL in the URLs group for a rule, metrics computation system 108 accesses data (from ingested data 114) for that URL and computes a metric value for that URL based upon the accessed data. PMS 102 then computes a metric value for the URL grouping rule based upon the metric values calculated for the matched URLs for that URL grouping rule.

For example, for computing a latency metric for a URL grouping rule, metrics computation system 108 determines a latency value associated with each URL that matches that rule and is included in the URLs group associated with that rule. The latency value for the URL grouping rule is then computed based upon the latency values for the URLs in the URLs group for the rule. Since the metric for the rule is based upon multiple metric values associated with the URLs in the URLs group for the rule, the metric for the rule is also referred to as an aggregation type metric or an aggregate metric. One or more such aggregate metrics may be computed by metrics computation system 108 for each URL grouping rule.

In certain embodiments, as shown in FIG. 1, metrics computation system 108 may communicate the set of one or more metrics computed for a URL grouping rule to consumers of the metrics 124. Examples of consumers include a performance engineer for the application being monitored, another system such as a reporting and analysis system that is configured to generate reports and charts based upon the metrics, and others.

In certain embodiments, one or more alerts may be configured for a URL grouping rule. Alerts system 110 is configured to manage these alerts. In certain implementations, after UGS 106 has created a new URL grouping rule and its associated URLs group, it informs alerts system 110 about the newly created URL grouping rule. Alerts system 110 may then enable one or more alerts to be specified for the newly created URL grouping rule. In certain embodiments, an alert may be tied to one or more performance metrics computed by metrics computation system 108 for the rule. For example, an alert may be configured for a URL grouping rule that specifies that a certain action (e.g., sending a communication to a performance engineer) is to be performed if a performance metric value (e.g., latency value) computed for the rule equals, exceeds, or falls below a particular threshold. Once an alert has been created for a URL grouping rule, alerts system 110 is responsible for raising an alert when the condition specified in the alert is satisfied.

Figure 2:
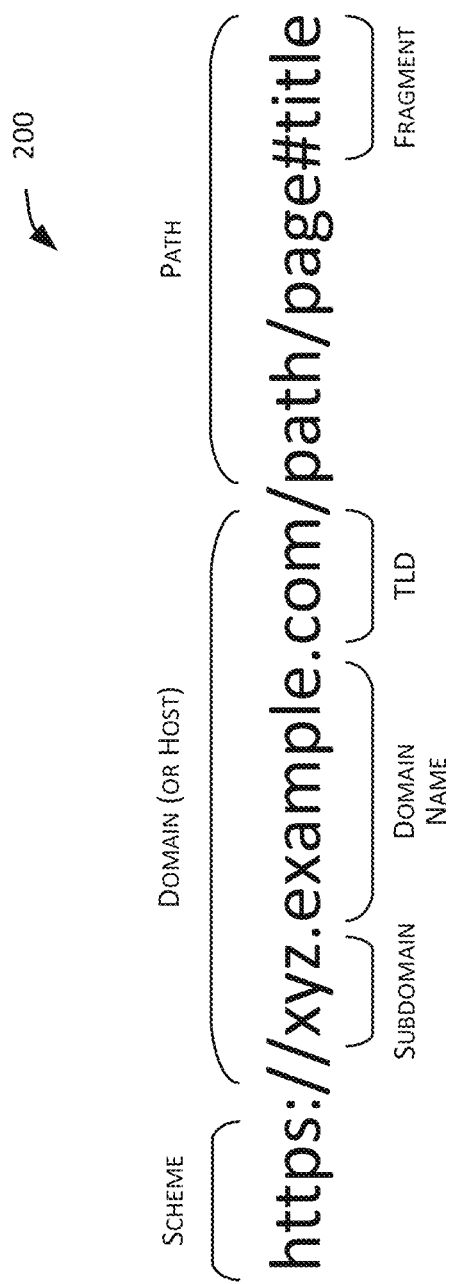
FIG. 2 depicts an example URL showing its components.

FIG. 2 depicts an example URL 200 ("https://xyz.example.com/path/page#title" showing its components. As shown, URL 200 comprises three main components, namely, a scheme component, a domain component (also referred to as a host component), and a path component. The scheme component identifies the protocol used. In FIG. 2, the scheme component is "https" identifying a secure version of http (hypertext transfer protocol). When a URL is entered in a browser, "https" or "http" informs the browser that the page is to be displayed in the hypertext format (HTML). Various other protocols may also be specified in the scheme component.

The domain or host component of a URL comprises tokens separated by a dot "." delimiter character or symbol. For example, the domain component of the URL depicted in FIG. 2 "xyz.example.com" comprises tokens: "xyz", "example", and "com". As another example, "subdomain.domain.com" contains tokens: "subdomain", "domain", and "com". In certain instances, the domain component may also include a port token that may be delimited by a ":" rather than a ".". For example, "http://foo.bar.com:8080/index.html".

Figure 5:
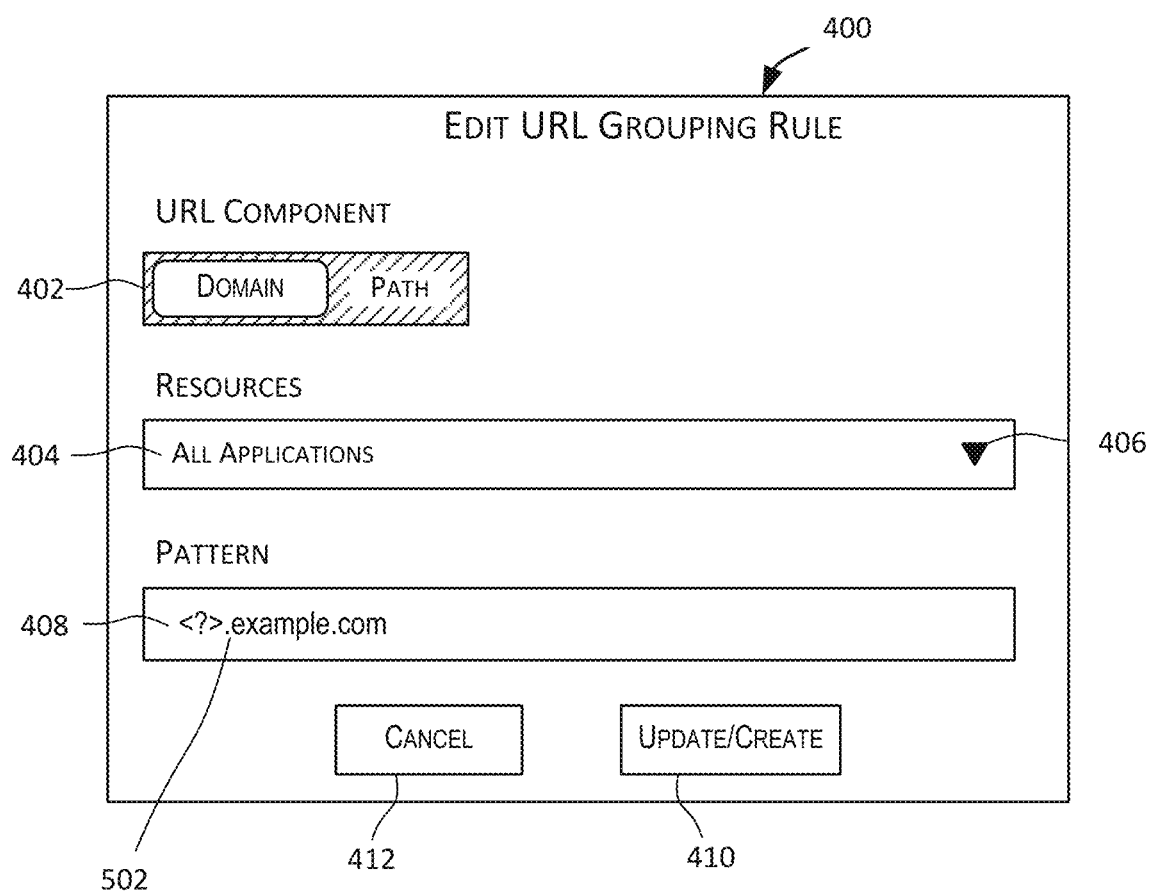
FIG. 5 depicts an example of using the GUI depicted in FIG. 4A for creating a rule targeting a domain component of a URL according to certain embodiments.

As shown in FIG. 5, the domain component may include tokens corresponding to a subdomain component (e.g., "xyz" in FIG. 2), a domain name component (e.g., "example" in FIG. 2), and a top-level domain (TLD) component (e.g., "com" in FIG. 2). The subdomain component identifies a type of resource that the browser will deliver in response to the URL being provided to the browser. For example, "www" is a very commonly used general subdomain for any resource on the web. More specific subdomains may be specified such as "video" when the data being requested using the URL is a video, "blog" for a blog page, and so on. Other subdomains may also be used.

The domain name component identifies a name for a website. The domain component typically identifies a company name, a brand name, etc.

The TLD component is also referred to as a domain extension and identifies a type of entity owning the website. Common TLDs include ".com" for commercial sites, ".org" for an organization, ".edu" for an educational or academic institution, ".co.uk" identifying a company in the United Kingdom, and so on.

The path component of a URL comprises tokens separated by a "/" delimiter character or symbol. The path generally identifies a location on a server (e.g., a particular directory on a server) where the resource pointed to by the URL is stored. For example, a path component of a URL may identify a route in the navigational structure of a website including directories, subdirectories, etc.

For some applications, the URLs associated with an application may use a "#" token at the end of a URL filepath to append a fragment. The following URL shows how blog posts from a single-page application are listed after the #symbol: "https://example.com/#/blogpost". In instances where the URL includes a fragment component, PMS 102 may be configured to extract and process the filepath and fragment components in different user-configurable ways. In certain configurations, PMS 102 extracts both the filepath component and the fragment component and the fragment component is treated as part of the path component. In this case, PMS 102 uses both the filepath and fragment component extracted from a URL for determining if the URL matches a path component targeted URL grouping rule. In other configurations, PMS 102 extracts both the filepath component and the fragment from a URL, but only the extracted filepath (i.e., the fragment component is not used) when processing is performed to determine if the URL matches a path component targeted URL grouping rule. For example, for the URL depicted in FIG. 2, the fragment "#title" would be excluded from any URL grouping rule-related pattern matching performed by PMS 102. In yet other configurations, PMS 102 extracts the patch component and the fragment, but only the fragment component (and not the filepath component) is used when processing is performed to determine if the URL matches a URL grouping rule targeting a path component. This may occur, for example, when the URL is associated with a single-page application. As described herein, for single page applications, a user specifying a rule targeting a path component can indicate, via a user-selectable element on GUIs provided by PMS 102, that the rule is to be applied to single-page applications. In the case of single-page applications, in certain implementations, PMS 102 may extract only the fragment component (and not the filepath portion before the fragment portion) from a URL associated with a single-page application and use it to determine if the URL matches a URL grouping rule targeted to a path component.

Figure 3:
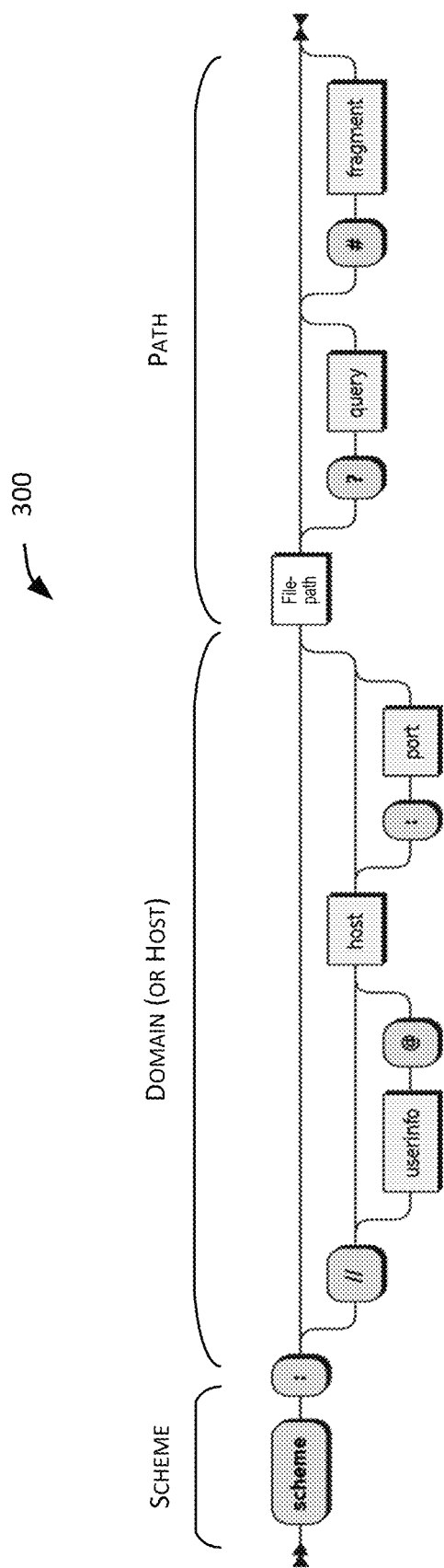
FIG. 3 shows another format of a URL.

In some cases, a URL may have a format as shown in FIG. 3. Even in this format, the URL comprises a scheme component, a domain (or host) component, and a path component, as shown in FIG. 3.

Figure 4A:
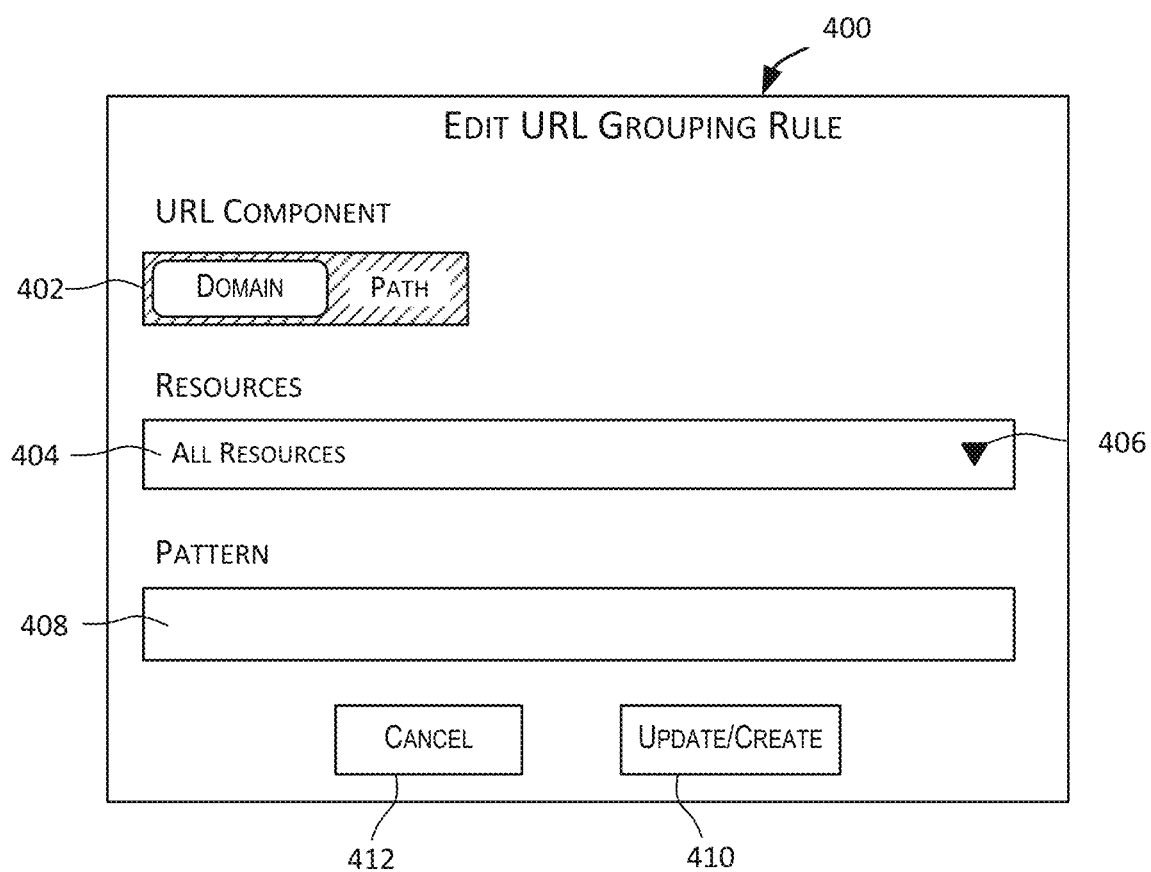
FIGS. 4A and 4B depict examples of a GUI provided by a PMS that enables URL grouping rules that are targeted to specific URL components to be authored according to certain embodiments.
Figure 4B:
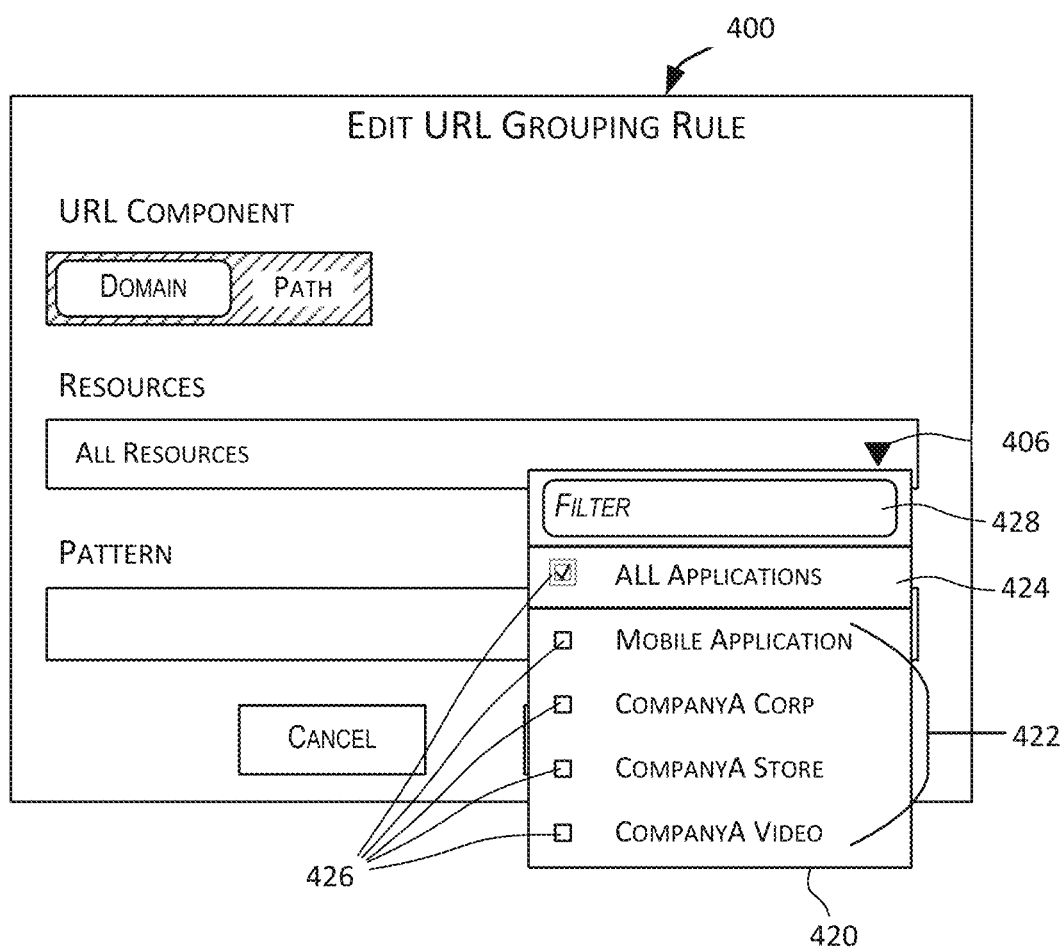

As indicated above, PMS 102 provides graphical user interfaces (GUIs) that enable rules to be input that are targeted to specific components of a URL. FIGS. 4A and 4B depict examples of a GUI 400 provided by PMS 102 that enables URL grouping rules that are targeted to specific URL components to be authored according to certain embodiments. GUI 400 includes a user interface (UI) element 402 that lists multiple URL components available for selection and enables a user to select a particular component of a URL from the list for which a rule is to be created. UI element 402 displays a set of URL components that the user can select from. In the embodiment shown in FIGS. 4A and 4B, the user is allowed to select between two URL components, namely, a domain component and a path component. This is not intended to be limiting. In alternative embodiments, the list of URL components that a user can select from can include other components such as a scheme component, a subdomain component, a domain name component, a TLD component, etc. In FIG. 4A, the domain component is shown as selected.

GUI 400 also includes other UI elements that enable a user to specify various other aspects and properties for the URL grouping rule being authored. For example, GUI 400 includes a UI element 404 that enables a user to select one or more resources (e.g., website, applications) to which the rule being authored can be applied. The applications selected using UI element 404 define the scope of the URL grouping rule being authored. In FIG. 4A, the "All Applications" option has been selected. UI Element 404 includes a drop-down menu item 406, which when selected, opens a window that lists a set of available resources (e.g., applications) for the user and/or customer associated with the user, and from which the user can select one or more or all the resources.

FIG. 4B depicts an example of a GUI window 420 that may be displayed when the user selects drop-down menu item 406. As shown in FIG. 4B, a list of resources 422 available for user selection are displayed. If the user is associated with a customer of PMS 102, such as "CompanyA", a list of resources 422 (e.g., applications) monitored by PMS 102 for CompanyA may be displayed. For example, as depicted in the example in FIG. 4B, the resources displayed for CompanyA include a Mobile Application, a CompanyA Corp application, a CompanyA Store application, and a CompanyA Video application. Additionally, an "All Applications" option 424 is also displayed. User-selectable checkboxes 426 are displayed next to each application. If the user wishes to select all the applications, then the user can select the checkbox next to the "All Applications" option, as shown in FIG. 4B. In certain implementations, by default, the "All Applications" option is selected. Alternatively, if the user does not want the rule being authored to apply to all the applications, then the user can select one or more specific applications by checking the checkboxes corresponding to those applications. In this manner, the user has complete control over the applications (or resources, in general) to which the rule being authored is to be applied. The URL grouping rule is scoped to the applications selected via window 420.

Window 420 also includes a filter box field 428 in which the user can enter some search criterion to filter down the applications displayed in list 422. If a search criterion is entered in field 428, only those resources that meet the search criterion are displayed in list 422. This enables the user to easily search for applications of interest to the user for the rule being created.

Referring back to FIG. 4A, GUI 400 includes an input field 408 in which the user can enter the rule to be created for grouping URLs. The rule applies to the URL component selected by the user using 402. In the example in FIG. 4A, since the domain component has been selected using option 402, the user can enter a rule in field 408 directed to the domain component of a URL.

Once the user has entered the desired rule in field 408, the user can select the "Update/Create" button 410 to instruct PMS 102 to create a new rule based upon the information entered by the user in GUI 400. The user can select "Cancel" button 412 to exit from GUI 400 without creating the rule.

In certain implementations, GUI 400 may be used not only to create new rules but also to edit previously created rules. When a new rule is to be created, upon invoking GUI 400, field 408 in GUI 400 will be blank. In order to edit a previously specified rule, the user can select the previously defined rule and then select an edit option, which in turn invokes GUI 400. In this case, the various fields and selectable options in the displayed GUI 400 will be populated according to the previous rule. The rule itself will be displayed in field 408. The user can then make changes to the rule and other aspects of the rule (e.g., scope), as desired, and upon selecting "Update/Create" button 410, the previously created URL grouping rule is updated based upon the changes entered by the user via GUI 400.

As described above, GUI 400 enables a user to enter a URL grouping rule, where the rule specifies a pattern. The rule and associated pattern may contain wildcarded portions. A wildcard in a rule and corresponding pattern indicates a match to one or more tokens in the position of the wildcard. When PMS 102 performs pattern matching to determine if a URL matches a rule, the URL is compared to the rule and its associated pattern to see if there is a match. A URL matches a rule if the URL matches the pattern corresponding to the rule. For a rule, all URLs that are found to match the rule (i.e., match the pattern corresponding to the rule) are grouped together in one group in the URLs group associated with the rule.

PMS 102 may support various special characters and associated syntax that help users to author a URL grouping rule. Examples of special characters that may be provided by PMS 102 in certain implementations are described in Table A below.

the data based on the matched expression. A capture group allows a one-to-many mapping from a pattern to normalized values. With capture groups, users can refer to the string matched by the wildcard in the original pattern, and add it to the output normalized value. Thus, a part of the normal-

TABLE A

Symbols for Wildcarding in Rules

| Wildcard Symbol | Description | Example URL Grouping Rule | Examples of Matching URL Components | Examples of Non-Matching URL components |
|---|---|---|---|---|
| <?> | Wildcard for a single token. | "/app/<?>" | "/app/v1"<br>"/app/v2"<br>"/app/dashboard" | "/app"-this does not match because there is no token after "/app". "/application/v1/dashboard"-this does not match because the pattern has only one token after "/app/" but in this path there are two tokens, namely, "v1" and "dashboard" after "/app/". "/applications/v1"-this does not match because "/applications" does not match the first token "/app". |
| <??> | Wildcard for one or more trailing tokens | "/app/<??>" | "/app/v1"<br>"/app/v2"<br>"/app/dashboard"<br>"/app/v1/dashboard"<br>"/app/v2/dashboard/123"<br>"/app/v2/dashboard/123/edit" | "/app"-this does not match because the pattern expects at least one token after "/app". "/applications/v1"-this does not match because "/applications" does not match "/app". |
| <w*> | Applies to any token that does not have any numbers in it. | "/app/<w*>" | "/app/chart"<br>"/app/dashboard" | "/app/v1"<br>"/app/v2" |

A rule can contain zero or more of the wildcard symbols described in Table A. Accordingly, a rule can be specified that contains no wildcard symbols. For example, "www.example.com". In some implementations, in addition to the options and syntax described above, regular expressions may also be used to specify a URL grouping rule.

Table B below shows additional examples of URL grouping rules and corresponding matching and non-matching URLs.

ized value is dynamic and changes based on the input. With capture groups, users do not have to know the exhaustive list of values at the position of the wildcard. For example, if the make of a car is in the second token position in the path component of a URL, then the following rule:

/cars/<1>(or/car/$1)

For an input URL of/cars/sedan/chevrolet?action=search, the rule will output cars/sedan. Capture groups can help users create a dynamic portion in the normalized URL,

TABLE B

Examples of URL grouping rules and Matching and Non-Matching URLs

| Example URL Grouping Rule | Matching URL Component | Non-Matching URL Component |
|---|---|---|
| /<?>/v2/<??> | /api/v2/users<br>/api/v2/profiles/edit<br>/app/v2/dashboard/123 | /api/v3/users<br>/app/dashboard/v2/charts<br>/app/v2 |
| /argentina/2020/<?>/<?>/ futbol/<?> | /argentina/2020/10/26/futbol/695.html<br>/argentina/2020/03/07/futbol/cup | /argentina/2020/10/26/futbol<br>/argentina/2020/10/26/futbol/cup/messi |
| site.co.<?> | site.co.id<br>site.co.sg | site.com<br>site.co |
| google.<??> | google.com<br>google.co.sg | www.google.com<br>googlesyndication.com |

In certain implementations, capture groups may also be used to specify a URL grouping rule. A capture group groups allowing a one-to-many mapping. As another example, if a user wishes to have a separate normalized URL for all types of sport sub-pages: site.com/sports/football/*; site.com/sports/volleyball/*; site.com/sports/badminton/*. With capture groups this can be expressed with one pattern that retains the capture group, which is between parentheses, in the normalized URL, such as: site.com/sports/(*)/*.

FIG. 5 depicts an example of using GUI 400 for creating a rule targeting a domain component of a URL according to certain embodiments. Such a rule is also referred to as a domain component rule. As shown in FIG. 5, UI element 402 indicates that the domain component of a URL has been selected. A rule "<?>.example.com" 502 has been entered in field 408 specifying a particular pattern for the domain component. The rule can be saved/created by selecting "Update/Create" button 410.

For the rule depicted in FIG. 5, when PMS 102 performs processing to see if a URL matches the rule, the URL will be deemed to match the rule if the URL contains "example.com" in the domain component of the URL and can contain any token in the subdomain component of the URL. For example, the following URLs would all match this rule:

"www.example.com/ . . . "
"blog.example.com/ . . . "
"video.example.com/ . . . "

and be grouped to the same URLs group corresponding to the "<?>.example.com" rule.

Figure 6:
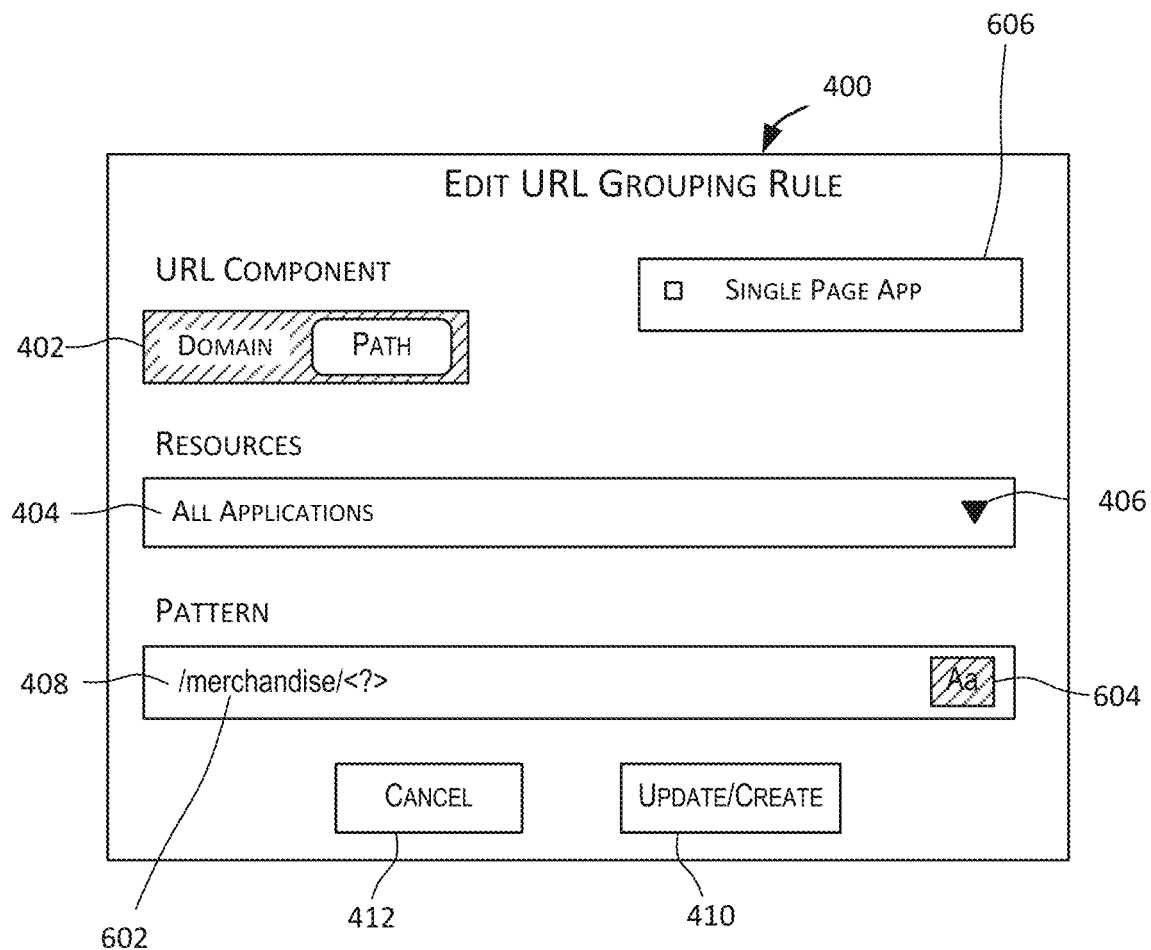
FIG. 6 depicts another example of using the GUI depicted in FIG. 4A for creating a rule targeting a path component of a URL according to certain embodiments.

FIG. 6 depicts another example of using GUI 400 for creating a rule targeting a path component of a URL according to certain embodiments. Such a rule is also referred to as a path component rule. As shown in FIG. 6, UI element 402 indicates that the path component of a URL has been selected. A rule "/merchandise/<?>" 602 has been entered in field 408 specifying a particular pattern for the path component. The rule can be saved/created by selecting "Update/Create" button 410.

For the rule depicted in FIG. 6, when the PMS 102 performs processing to determine if the URL matches the rule, the URL will be deemed to match the rule if the URL path component ends with "/merchandise" followed by another token. For example, URLs with the following path components would all match this rule:

"/merchandise/product1"
"/merchandise/product2"
"/merchandise/USA"

and these URLs will be grouped to the same URLs group corresponding to the

"/merchandise/<?>" rule.

Unlike domain components, path components can be case sensitive. As depicted in FIG. 6, GUI 400 provides a UI element 604 that enables the user authoring a path component rule to indicate whether, when pattern matching is performed, the rule is to be treated as case sensitive or not. In certain implementations, case insensitive is the default, and the user has to toggle off the case-insensitive default by using UI element 604. In certain implementations, if a path component rule is to be applied in a case-insensitive manner, then the rule is converted and stored in lower case. When a URL is checked to see if it matches the rule, the URL is also preprocessed and converted to lower-case prior to pattern matching.

GUI 400 depicted in FIG. 6 also provides a UI element 606 for specifying whether the path component rule being input will apply to single-page applications. A single-page application is typically a website or a web application implementation that loads only a single web document, and then updates the body content of that single document via JavaScript APIs such as XMLHttpRequest and Fetch when different content is to be shown. A single page application dynamically rewrites a current web page with new data from the web server, instead of the default method of a web browser loading entire new pages. This allows consumers of the application to use websites without loading whole new pages from the server which can result in performance gains and a more dynamic user experience. In a single-page application, a fragment in the URL may be used to represent reusable portions of the application. UI element 606 enables a user to indicate whether the rule being created is to apply to single-page applications. In certain implementations, if a URL grouping rule targeting a path component is to be applied to a single-page application, then for a URL associated with the single-page application, both the filepath component and the fragment component may be extracted from the URL (or in some implementations, only the fragment component is extracted), but only the fragment component is used to determine if the URL matches the pattern corresponding to the URL grouping rule. For applying the rule to single-page applications, the checkbox in UI element 606 should be toggled on by the user.

Figure 7:
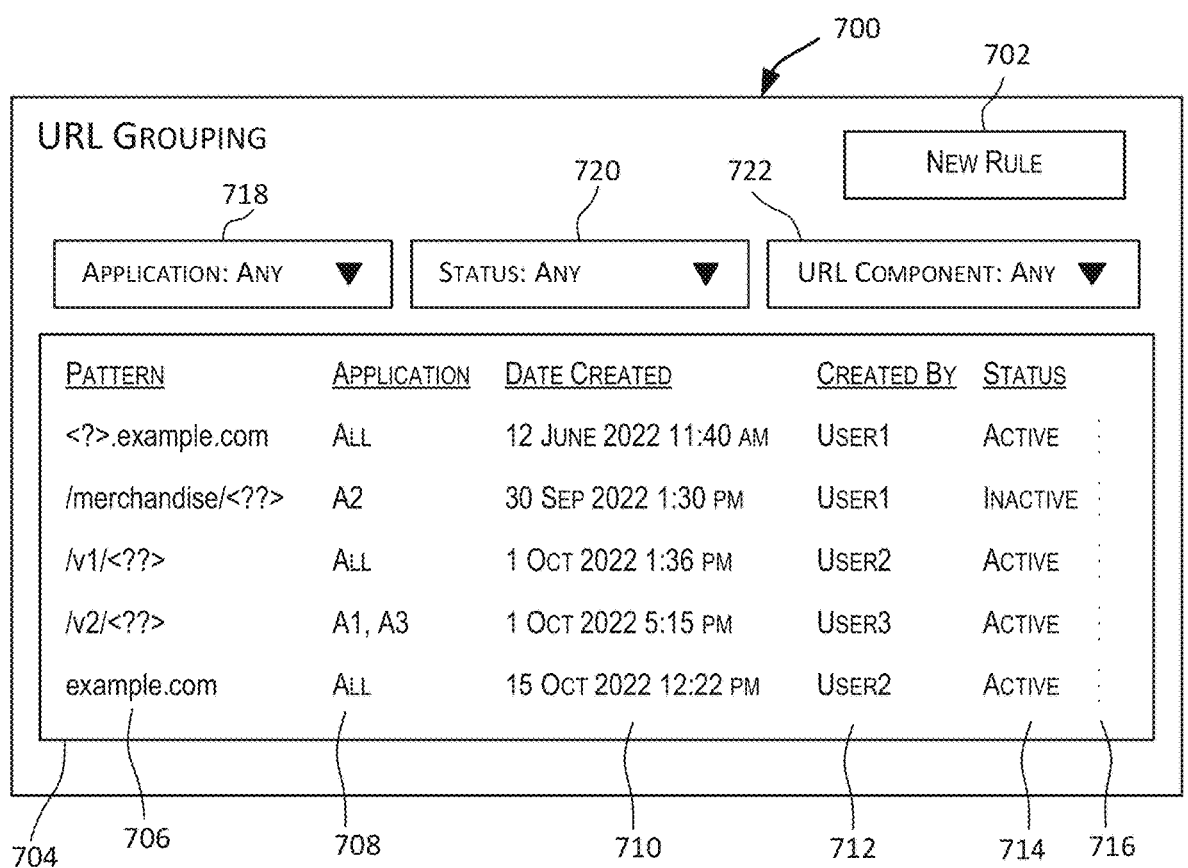
FIG. 7 depicts an example GUI that enables a user or customer of a PMS to manage customized URL grouping rules that have been created for the user or customer according to certain embodiments.

In certain implementations, PMS 102 provides one or more GUIs for managing URL grouping rules that have been created for a user or customer of PMS 102. FIG. 7 depicts an example GUI 700 that enables a user or customer of PMS 102 to manage customized URL grouping rules that have been created for the user or customer according to certain embodiments. As shown in the example in FIG. 7, GUI 700 includes an area 704 in which information related to customized URL grouping rules created for the user or customer is displayed. If the customer is "CompanyA", all customized URL grouping rules created for CompanyA by one or more users associated with CompanyA are displayed in GUI 700 in area 704. As shown in FIG. 7, the displayed information includes information 706 identifying a list of URL grouping rules, including one or more domain component rules and path component rules. For each rule, information 708 is displayed indicative of the one or more applications to which the URL grouping rule applies (i.e., the scope of the URL grouping rule), a date 710 when the URL grouping rule was created, information 712 identifying a user who created the URL grouping rule, and a status 714 associated with the URL grouping rule. In certain implementations, the status can be active or inactive. When a rule is in inactive status, it is not used.

For each rule, UI element 716 is provided that can be selected by a user to invoke additional actions that can be performed on the rule. In certain implementations, upon selecting UI element 716 in the same row as a URL grouping rule, a menu is displayed to the user enabling the user to select an action to be performed on that URL grouping rule. These actions may include, for example, an action: to activate or deactivate a URL grouping rule, delete the URL grouping rule, edit the URL grouping rule, and other actions. A deactivated rule is assigned an inactive status and the rule is not used for URLs grouping. A rule can be deactivated or activated as desired by the user.

GUI 700 also includes a button 702 labeled "New Rule" to create a new customized URL component specific rule. In certain embodiments, selecting button 702 brings up GUI 400 depicted in FIGS. 4A, 5, and 6.

Additional user-selectable elements (e.g., buttons) are provided for filtering the rules-related information displayed in area 704. For example, a button 718 is provided that allows the user to filter the information displayed in 704 based upon applications to which the rules apply. The user can select specific applications, or all applications. Based upon the user selection, only rules that apply to the user-selected application(s) (i.e., the selected applications are within the scope of the rule) are displayed in area 704.

A button 720 is provided that allows the user to filter the information displayed in 704 based upon the status of the rules. The user can select active status only, inactive status only, or any status. Based upon the user selection, only rules with the user-selected status are displayed in area 704.

A button 722 is provided that allows the user to filter the information displayed in 704 based upon the URL components to which the rules apply. In certain implementations, the user can select domain component only, path component only, or any component. Based upon the user selection, only rules directed to the user-selected URL component(s) are displayed in area 704. For example, if "domain component" is selected using button 722, then only customized rules for the customer that are directed to the domain component are displayed in 740. In a comparable manner, if "path component" is selected using button 722, then only customized rules for the customer that are directed to the path component are displayed in 740. If "any" component is selected, then both domain component rules and path component rules configured for the customer are displayed in area 740.

Figure 8:
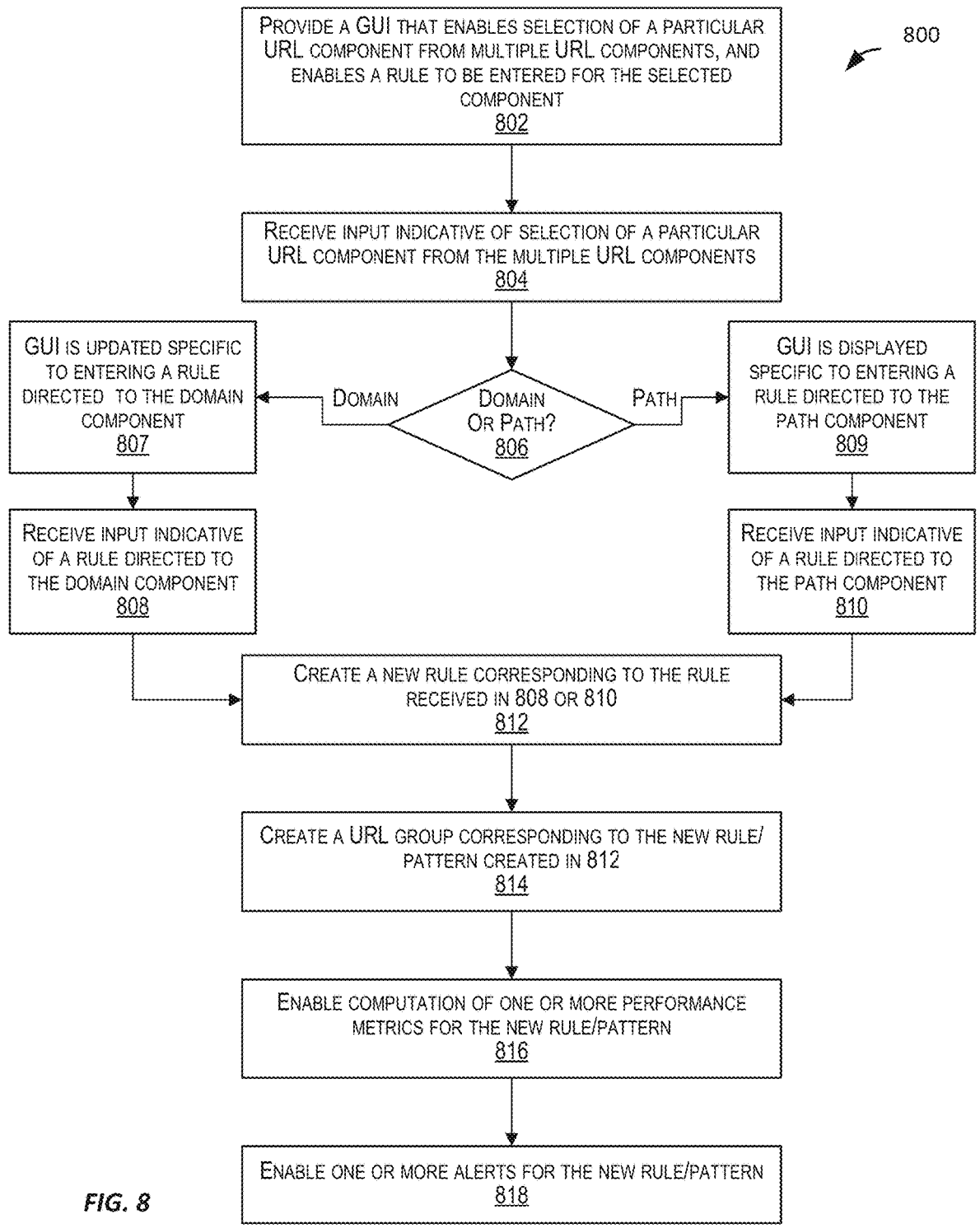
FIG. 8 depicts a simplified flowchart depicting processing performed for creating a new user customized URL grouping rule directed to a particular component of a URL according to certain embodiments.

FIG. 8 depicts a simplified flowchart 800 depicting processing performed for creating a new user customized URL grouping rule directed to a particular component of a URL according to certain embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order, or some steps may also be performed in parallel.

In certain embodiments, such as in the embodiment depicted in FIG. 1, the processing depicted in FIG. 8 may be performed by PMS 102. The individual processing steps may be performed by one or systems of PMS 102. For example, the processing in 802, 804, 806, 807, 808, 809, 810, 812, and 814 may be performed by UGS 106. Processing in 816 may be performed by UGS 106 and metrics computation system 108. Processing in 818 may be performed by UGS 106 and alerts system 110.

At 802, PMS 102 provides a GUI for authoring a URL grouping rule, where the GUI where the GUI enables a particular URL component to be selected a list of multiple URL components of a URL and enables a user to input information specifying a rule to be created that is targeted or directed the selected URL component. For example, in certain embodiments, a GUI such as GUI 400 depicted in FIG. 4A may be provided by PMS 102, where the GUI enables a user to select between a domain component or a path component of a URL. In alternative embodiments, other GUIs may be provided.

While GUI 400, depicted in FIG. 4A, and the examples described in this disclosure allow the user to choose between a domain component and a path component, this is not intended to be limiting. The list of URL components from which the user can choose a particular URL component to which the rule is to be directed can include other URL components such as the scheme component, TLD component, subdomain component, domain name component, and the like. In certain implementations, the list only includes non-overlapping URL components. In other implementations, the list can include overlapping or non-overlapping URL components.

At 804, PMS 102 receives input indicative of a particular URL component being selected by the user from the multiple URL components. Further processing may depend upon the URL component selected in 804. The example depicted in FIG. 8 assumes that the choice is between a domain component and a path component. Accordingly at 806, a determination is made whether the input received in 804 identifies a domain component or a path component as being selected.

Upon determining in 806 that the selected component is a domain component, at 807, the GUI may be updated, as needed, for the entering a rule for the selected component. At 808, PMS 102 receives information regarding the URL grouping rule authored by the user and directed to the domain component. The rule received in 808 identifies a pattern (also referred to as a domain component pattern) that is to be used for matching URLs when processing is performed by PMS 102 to determine if a URL matches the rule. Other information such as information identifying the scope of the rule, identity of the user creating the rule, a date and time when the rule was created, etc., may also be received in 808.

Upon determining in 806 that the selected component is a path component, at 809, the GUI may be updated, as needed, for the entering a rule for the path component. For example, the GUI may be updated to include UI elements that enable a user to select whether the rule is to be applied in a case-sensitive or case insensitive way, which enable a user to indicate whether the rule is to be applied to single-page applications, etc. At 810, PMS 102 receives information regarding the URL grouping rule authored by the user and directed to the path component. The rule received in 810 identifies a pattern (also referred to as a path component pattern) that is to be used for matching URLs when processing is performed by PMS 102 to determine if a URL matches the rule. Other information such as information identifying the scope of the rule, whether the rule is to be applied in a case-sensitive or case insensitive way, whether the rule applies to a single-page application, identity of the user creating the rule, a date and time when the rule was created, etc., may also be received in 810.

As indicated above, the input information received in 808 and 810 may identify the scope of the rule, which identifies a set of applications (or resources, in general) to which the rule can be applied to. In certain implementations, by default, the scope of a rule is scoped to all applications for that user or a customer for which the user is authoring the rule. However, constraints can be placed on which applications a rule can be applied to. For example, the user can restrict the applications that a rule can be applied to, i.e., the scope of the rule, to less than all the applications for that user or customer. For example, the user can specify a subset of all the applications, where the subset does not include at least one application that is included in all the applications.

At 812, the PMS creates a new URL grouping rule based upon the information received in 808 or 810. Information regarding the applications to which the rule can be applied to is also associated with the new rule. For a path component rule, information received in 810 whether the rule is to be applied in a case incentive (default) or sensitive manner, and whether the rule is to be applied to a single-page application is also stored and associated with the new rule created in 812.

At 814, a new URLs group is created for the new rule. The URLs group created in 814 provides a group for grouping all URLs that match the rule received in 808 or 810.

At 816, computation of one or more performance metrics is enabled for the newly created group. In the embodiment depicted in FIG. 1, as part of the processing performed in 816, UGS 106 may send a signal to metrics computation system 108 informing it of the newly created rule and requesting it to initiate computation of one or more metrics for the rule. Metrics computation system 108 may then initiate computation of metrics for the newly created URL grouping rule.

PMS 102 may use different computation techniques to compute the metric values for a URL grouping rule. In certain implementations, metrics computation system 108 computes a performance metric for a URL grouping rule based upon URLs that have matched to the rule, i.e., URLs that have been added to the URLs groups for the rule. For each URL in the URLs group for a rule, metrics computation system 108 accesses data, from ingested data 114, for that URL and computes a metric value for that URL based upon the accessed data. PMS 102 then computes a metric value for the URL grouping rule based upon the metric values calculated for the matched URLs for that URL grouping rule. For example, for computing a latency metric for a URL grouping rule, metrics computation system 108 determines a latency value associated with each URL that matches that rule and is included in the URLs group associated with that rule. The latency value for the URL grouping rule is then computed based upon the latency values for the URLs in the URLs group for the rule. Since the metric value for the rule is based upon multiple metric values associated with the URLs in the URLs group for the rule, the metric for the rule is also referred to as an aggregation type metric or an aggregate metric. One or more such aggregate metrics may be computed by metrics computation system 108 for each URL grouping rule.

At 818, one or more alerts may be set up for the newly created rule. In the embodiment depicted in FIG. 1, as part of the processing performed in 818, UGS 106 may send a signal to alerts system 110 informing it of the newly created. Alerts system 110 may then enable one or more alerts to be associated with the newly created rule. In certain embodiments, an alert defined for a URL grouping rule may be tied to one or more performance metrics computed by metrics computation system 108 for the rule. For example, an alert may specify that a certain action (e.g., sending a communication to a performance engineer) is to be performed if a performance metric computed for the new URL group equals, exceeds, or falls below a particular threshold. Alerts, including the actions to be taken, the performance metrics on which the alert is to be based, and the threshold conditions for the alert, etc. are user configurable.

In the manner depicted in FIG. 8 and described above, metrics computation and alerting are initiated for a new rule. A user or customer may specify multiple customized rules, including multiple domain component rules and multiple path component rules. Metrics computation is initiated for each of the customized rules. For example, assume that, for a customer of PMS 102, two customized domain component rules (DCR #1 and DCR #2) and two customized path component rules (PCR #1 and PCR #2) have been created. PMS 102 computes performance metrics values for each of the rules DCR #1, DCR #2, PCR #1, and PCR #2. For each URL grouping rule, the one or more metric values for the rule are calculated based upon metric values determined for the one or more URLs that are in the URLs group corresponding to the rule. As indicated above, URLs that match the pattern corresponding to a rule get added to the URL group corresponding to the rule. For example, one or more performance metric values are computed for DCR #1 based upon the data associated with URLs that are included in the URL group corresponding to DCR #1. In a similar manner, one or more performance metric values are computed for DCR #2 based upon the data associated with URLs that are included in the URL group corresponding to DCR #2; one or more performance metric values are computed for PCR #1 based upon the data associated with URLs that are included in the URL group corresponding to PCR #1; one or more performance metric values are computed for PCR #2 based upon the data associated with URLs that are included in the URL group corresponding to PCR #2.

In certain embodiments, in addition to computing metric values for each of the URL grouping rules configured for a user or customer, PMS 102 also initiates metric values computation for combinations of the user-specified URL grouping rules. For example, in the example above, rules DCR #1, DCR #2, PCR #1, and PCR #2 are created for a particular customer of PMS 102. In addition to computing metrics for each of these rules, PMS 102 also initiates metrics computation for combinations of the rules. For example, in certain implementations, PMS 102 initiates metrics computation for the following rules combinations:

(DCR #1+DCR #2)–PMS 102 computes metrics for this combination based upon URLs that matched DCR #1 and URLs that matched DCR #2. Since the same URL can match multiple rules and thus be added to multiple URL groups corresponding to the matched rules, when computing metrics for the various rules' combinations, PMS 102 takes care to ensure that the data associated with a URL is not accounted for more than once in computation of the metrics. For example, there may be some URLs that matched both DCR #1 and DCR #2. PMS 102 takes care to avoid any such duplication. A set of URLs for the combination is determined that is a union (thus removing any duplicates) of the set of URLs that matched DCR #1 and a set of URLs that matched DCR #2. The metric values computed for the individual URLs in the set for the combination are then used to compute a metric value for the combination. In an analogous manner, PMS 102 computes metric values for the various combinations below.

(PCR #1+PCR #2)
(DCR #1+PCR #1)
(DCR #1+PCR #2)
(DCR #2+PCR #1)
(DCR #2+PCR #2)
(DCR #1+DCR #2+PCR #1)
(DCR #1+DCR #2+PCR #2)
(PCR #1+PCR #2+DCR #1)
(PCR #1+PCR #2+DCR #2)
(DCR #1+DCR #2+PCR #1+PCR #2)

Accordingly, when a new rule is created, as depicted in FIG. 8 and described above, in addition to initiating metrics computation for the group of URLs corresponding to the new rule, PMS 102 may also, based upon groups associated with other previously defined URL grouping rules, create new group combinations and initiate metrics computation for the combinations.

Computing metrics for these combinations of groups corresponding to the URL grouping rules enables a user to request metrics not just for the customized rules themselves but also for the various combinations of the groups corresponding to the rules. This is greatly beneficial for the user in monitoring the performance of their applications since the user can analyze the data from different perspectives.

As referred to above and described with reference to FIG. 1, PMS 102 receives URL-associated data generated by applications that are monitored by PMS 102 for its users and customers. For example, PMS 102 may be configured to perform performance monitoring for five applications for a customer (e.g., CompanyA) of PMS 102. PMS 102 may receive data generated from usage of these applications. PMS 102 is then configured to generate performance metrics based upon the received data that provides a view of the performance of the five applications and also provides insights for performance engineers to improve the performance of the applications, or at least to avoid inferior performance. As part of this processing, PMS 102 identifies URLs occurring in the data received for the customer, identifies matches between the identified URLs and the configured rules and creates groups of URLs based upon the matches. Metrics are then computed for each of the groups and the metrics used for monitoring the performance of the applications. The metrics may be provided to performance engineers of CompanyA.

FIG. 9 depicts a simplified flowchart 900 showing processing performed by a PMS for matching URLs to customized URL grouping rules directed to specific components of a URL according to certain embodiments. The processing depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the processing may be performed in some different order, or some steps may also be performed in parallel. In the embodiment depicted in FIG. 1, the processing depicted in FIG. 9 may be performed by PMS 102, or more specifically by UGS 106.

At 902, the PMS identifies an input URL for which processing is to be performed to determine if the URL matches any URL grouping rules. For example, the input URL may be identified from ingested data 114 received by the PMS 102 for a particular user or for a particular customer of PMS 102. In certain implementations, as URLs-associated data 112 data for a customer is ingested and stored as ingested data 114, PMS 102 may scan the newly ingested data to identify the occurrences of one or more URLs. Each of these newly identified URLs may be treated as an input URL and processed according to the flowchart depicted in FIG. 9 and described below.

At 904, PMS 102 identifies the components of the input URL (e.g., domain component, path component) and the input URL is tokenized using a delimiter character specific to each URL component. Tokenization of the input URL results in the generation of a tokenized form of the input URL comprising a sequence of tokens. Tokenization is performed for the entire input URL including the domain component of the URL and the path component of the input URL.

For example, if the input URL is "www.google.com/api/v2/dashboards/dHyweUh", the domain component of the input URL is identified in 904 as "www.google.com" and the path component is identified as "api/v2/dashboards/dHyweUh". The entire URL is then tokenized, including the domain and path components of the URL. In certain implementations, the dot "." is used as a delimiter for tokenizing the domain component of the input URL. The domain component of the input URL is tokenized to: ["www", "google", "com"].

For the path component of the input URL, the slash "/" is used as a delimiter. For example, the path component of the example input URL "api/v2/dashboards/dHyweUh" is tokenized as follows: ["api", "v2", "dashboards", "dHyweUh"].

The tokenized forms for each of the domain component and the path component of the input URL contain a sequence of tokens delimited by the delimiters in those components. A token is a portion of the URL that is between two delimiters in the URL or is between a delimiter and the end of the URL string. In certain implementations, the extracted tokens may contain any character except URL special characters such as component delimiters (e.g., ":", "/", "?", "#", "[", "]", "@").

In certain use cases, as part of the processing performed in 904, the input URL may be pre-processed prior to tokenization. Pre-processing can involve cleaning the input URL to ensure consistent tokenization results in some edge cases. Pre-processing may involve, for example, removing trailing delimiters (e.g., trailing slashes and periods) from the input URL. For example, an input URL "/sport/individual/tennis/" with the trailing "/" may be pre-processed to remove the trailing slash and convert the URL to "/sport/individual/tennis" prior to tokenization.

Pre-processing may also involve changing the case of the letters in the input URL. In certain implementations, by default, pattern matching between the customized rules and the input URL is performed in a case-insensitive manner. In such implementations, the rules and associated patterns may be stored in lower-case form. As part of the pre-processing, the input URL may also be converted to lower-case prior to it being tokenized.

In certain implementations, post-processing may be performed after tokenization and prior to pattern matching. In certain use cases, URL decoding may be performed as part of this post-processing wherein the input URL is tokenized and then the individual tokens are decoded. For example, an input URL with path component "/foo/my %3Ftoken" is first tokenized in 904 to yield a tokenized form: ["foo", "my %3Ftoken"]. Then, as part of 904, URL decoding is applied to each extracted token, resulting in the token set with values: ["foo", "my?token"]. This post-processing enables users to enter rules without having to think about URL decoding issues. They can assume that PMS 102 will perform the decoding and use the decoded values for pattern matching. For the example above, users can enter the rule "<?>/my?token", so the pattern tokens contain the unencoded characters.

At 906, PMS 102 identifies a set of customized rules, including any domain component rules and path component rules, to be applied (i.e., to be checked if the input URL matches the rule) to the input URL. Numerous factors influence the selection of rules in 906. The set of rules that are identified in 906 are based upon the user and/or customer associated with the input URL. For example, if the input URL is part of data received by the PMS 102 for a particular customer (e.g., CompanyA), then customized rules that have been configured for that particular customer are identified in 906. These rules may then be filtered based upon one or more criteria as discussed below.

The input URL is typically associated with an application. For example, a tag may be associated with the input URL identifying the application that is associated with the input URL. This information about the application associated with the input URL also influences whether a customized rule is to be applied to the input URL or not. As discussed above, when a customized URL grouping rule is specified, the rule is scoped to a certain set of applications. The rule may be scoped to all applications for that customer or, alternatively, constraint may be associated with the rule identifying a smaller subset of applications to which the rule is to be applied. By default, the rule is scoped to all applications. Accordingly, as part of the processing in 906, for each customized URL grouping rule to be applied to the input URL, PMS 102 checks any applications-related constraints imposed on the rule and determines whether or not the rule can be applied to the input URL based upon these constraints. For example, if the input URL is associated with an application and the application is not included in the set of one or more applications that the rule can be applied to, then in 906, that rule is not selected for applying to the input URL.

The status of a rule also influences whether the rule is selected in 906 to be applied to the input URL. In certain implementations, a rule with an inactive status is not selected in 906.

At 908, PMS 102 performs processing to identify one or more rules, from the set of rules identified in 906, that are matched by the input URL. As part of this processing, PMS 102 performs pattern matching between the input URL and the pattern corresponding to the URL grouping rule being evaluated. In certain implementations, the tokenized form of the input URL generated in 904 is used to perform the pattern matching. In certain implementations, each rule identified in 906 may also be tokenized, and the tokenized form of the rule is used while performing the pattern matching.

As part of the pattern matching performed in 908, to determine if the input URL matches a domain component rule, the tokenized form of the domain component portion of the input URL is matched to the pattern corresponding to the domain component rule. As part of the pattern matching performed in 908, to determine if the input URL matches a path component rule, the tokenized form of the path component portion of the input URL is matched to the pattern corresponding to the path component rule. In certain embodiments, the input URL is considered to match a rule targeting a particular URL component (e.g., domain component, path component) if that particular component of the URL matches a pattern corresponding to a particular rule directed to the same component. For example, when pattern matching is performed between the input URL and a domain component rule, the input URL is considered to match the domain component rule when the domain component of the input URL matches the pattern corresponding to the domain component rule. Likewise, when pattern matching is performed between the input URL and a path component rule, the input URL is considered to match the path component rule when the path component of the input URL matches the pattern corresponding to the path component rule. In certain implementations, when a particular component of the input URL contains the same non-wildcarded tokens identified in the URL component rule and in the positions identified in the rule, and also contains or does not contain tokens corresponding to the wildcarded symbols indicated in the rule, it is considered to be a match.

The input URL is considered to match a domain component rule, if the domain component of the input URL matches the pattern corresponding to the domain component rule. The input URL is considered to match a path component rule, if the path component of the input URL matches the pattern corresponding to the path component rule. This contrasts with previous implementations for specifying URL patterns where an input URL matched a pattern if the pattern was found anywhere in the input URL, including in the domain and/or path portions and combinations thereof, and there was no additional indication of the specific component of the input URL to be matched. With an exact match requirement for a particular component of the URL, as described in this disclosure, ambiguous and unexpected URL groupings are avoided or minimized. In certain implementations, tags are associated with the input URL identifying the one or more rules that the URL matches.

At 910, for each matched rule identified in 908, the input URL is added to the URLs group corresponding to the matched rule. For example, if the one or more matched rules identified in 908 include a path component rule "/merchandise/<?>" and a domain component rule "<?>.example.com", and the input URL is "blog.example.com/merchandise/prod1", the input URL matches both of these rules. Accordingly, in the processing performed in 910, the input URL is added to a URLs group corresponding to path component rule "/merchandise/<?>", and also added to a URLs group corresponding to domain component rule "<?>.example.com".

At 912, PMS 102 then computes a set of one or more performance metrics for each matched rule identified in 908 based upon the one or more URLs in the URLs group corresponding to the matched rule. As part of the processing in 912, for each matched rule, PMS 102 determines the one or more URLs in the URLs group corresponding to the matched rules, accesses data associated with the URLs in the group, calculates a metric value for each of the URLs in the group based upon the data accessed for that URL, and then computes an aggregate performance metric value for the URL grouping rule based upon the metric values computed for the individual URLs in the URLs group for the rule. In this manner, the metric value for a URL grouping rule is computed based upon the data accessed related to the URLs that match the rule (i.e., the URLs included in the URLs group for that rule).

In certain implementations, PMS 102 may use a certain time window for the metrics computation. For example, the data with a time stamp in the last (e.g., from the time of processing of the flowchart in FIG. 9) "X" minutes (or hours, or days, or weeks, etc.) for the URLs in a URL group is accessed and used to determine the aggregate performance metrics for the URL group.

PMS 102 may compute different metrics in 912. In certain implementations, the type of metrics computed for a URL grouping rule may depend upon whether the URL grouping rule is targeted to a domain component or a path component.

At 914, the metrics computed in 912 are provided to one or more consumers of the metrics. For example, if the input URL is for a customer of PMS 102 (e.g., CompanyA), then the metrics may be communicated or provided to a performance engineer or other user associated with CompanyA. In certain implementations, reports, charts, tables, etc. being provided to the customer may be dynamically updated with the metrics calculated in 912.

The metrics that are generated for the different URL grouping rules can be used for performance monitoring of the related applications. For example, metrics computed for a rule directed to a domain component may include metrics computed at the website level such as number of requests received by the website, number of requests sent by a website to a backend server since the backend server will have a unique hostname, and others. Metrics computed for a rule directed to a path component may be computed for various pieces of information contained in the path of a URL. For example, metrics related to different application versions that are being called from a website. For example, a URL grouping rule such as "us.example.co.tx/v1/<??>" may be used to group matching URLs related to version "v1" and metrics can be computed for this group of URLs. A URL grouping rule such as "us.example.co.tx/v2/<??>" may be used to group matching URLs related to version "v2" and metrics can be computed for this group of URLs. A performance engineer can then compare the metrics computed for "v1" and "v2" to compare performances of the versions.

At 916, alerts, if any, may be generated responsive to and based upon the metrics generated in 912 for the matched rules and based upon alerts configured for each match rule. The alerts may also be delivered to their intended consumers. For example, if a metric computed in 912 for a URL grouping rule exceeds a certain preconfigured threshold, an alert may be raised and communicated to a user preconfigured to receive the alert message. In certain implementations, reports, charts, tables, etc. showing alerts information may be dynamically updated to show information regarding any alert raised in 916.

Figure 15:
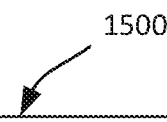
FIG. 15 depicts an example GUI showing network errors (measured per minute) for multiple URL grouping rules according to certain embodiments.

As described above, one or more performance metrics may be computed for each URL grouping rule. Examples of metrics that may be computed for a URL grouping rule include without limitation metrics measuring: requests, errors (e.g., network errors) and error rates, latency, throughput metrics, and the like. GUIs may be generated displaying metrics computed for URL grouping rules. FIG. 15 depicts an example GUI 1500 showing network errors (measured per minute) for multiple URL grouping rules according to certain embodiments. GUI 1500 displays a list of user-customized URL grouping rules and associate metric values. For example, for URL grouping rule "<?>.example.com" there are 133.2 network errors per minute.

The second metric value indicates that 133.2/m value represents a drop of in network errors by 12.87 errors per min. In certain implementations, in order to compute this metric value, metrics computation system 108 determines all URLs that matched rule "<?>.example.com", i.e., all URLs included in the URLs group associated with rule "<?>.example.com". Metrics computation system 108 then determines a network errors/minute value for each URL in the URLs group based upon data associated with the URL. Metrics computation system 108 then determines an aggregate network errors per minute value for the rule based upon the network errors/minute values determined for the URLs that matched the rule.

GUI 1500 may offer several drill-down options. For example, a user can select a particular URL grouping rule (e.g., by clicking on the displayed rule, hovering a mouse pointer on a rule) and invoke a GUI that shows historical network error values for the selected rule. For example, a graph may be displayed showing the network errors metric values for the rule on the Y-axis and time along the X-axis.

Displaying Example Matched URLs

PMS 102 also provides additional tools and techniques to assist users in authoring URL grouping rules. In certain implementations, PMS 102 displays a list of example URLs that match a URL grouping rule. For a rule configured for a customer of PMS 102, the example matched URLs are selected by PMS 102 from a candidate set of URLs identified from data associated with that customer. Accordingly, the examples that are displayed are URLs occurring in the customer's own data.

The example matched URLs that are displayed help a user to easily and readily determine whether a URL grouping rule has been correctly specified or if there is an error. For example, for a particular URL grouping rule, if the example matched URLs that are displayed for the rule do not match the URLs expected by the user to match the rule, then it may indicate an error in the URL grouping rule itself. Upon identifying the error, the user can immediately edit the rule and make any corrections. A user authoring a rule can also try out different versions of the rule and, for each version, check the example matched URLs that are displayed for each version of the rule. In this manner, displaying the example matched URLs enables the user to make changes as desired and get instant feedback through the example matched URLs that are displayed for the rule. This significantly helps users to enter correct URL grouping rules.

Figure 10:
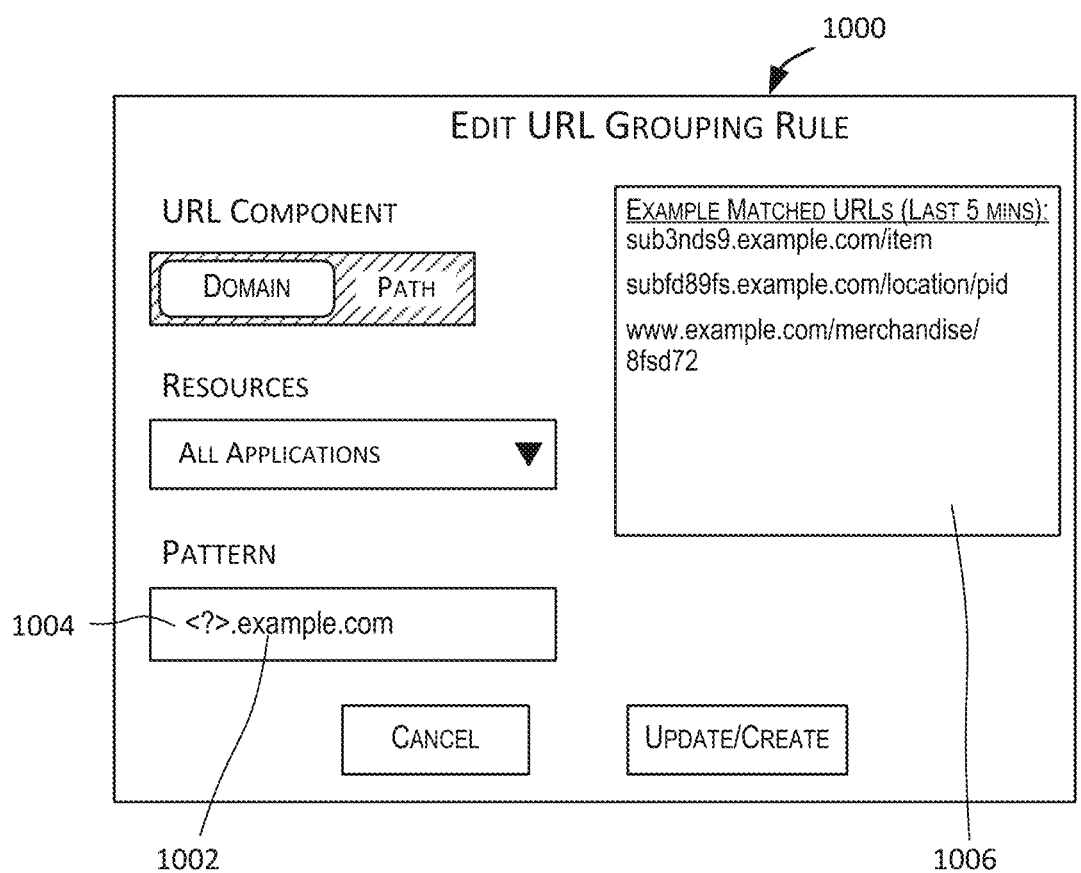
FIG. 10 depicts a GUI that includes a window that shows example matched URLs for a URL grouping rule as the URL grouping rule is being authored according to certain embodiments.

The example matched URLs may be displayed in different contexts and use cases. In one context, the example matched URLs may be displayed as the user is entering a new URL grouping rule, such as via interface 400 depicted in FIG. 4A. FIG. 10 depicts a GUI 1000 that includes a window that shows example matched URLs for a URL grouping rule as the URL grouping rule is being authored according to certain embodiments. GUI 1000 is similar to GUI 400 depicted in FIG. 4A and FIG. 5. In FIG. 10, the user has selected the domain component. The user has additionally entered a domain component rule 1002 ("<?>.example.com") in field 1004, where rule 1002 is directed to the domain component of a URL. A window 1006 is displayed showing example matched URLs that match rule "<?>.example.com" 1002. The user authoring rule 1002 is thus provided instant feedback regarding the URLs that match rule 1002 entered in field 1004. Based upon the URLs displayed in window 1006, the user can determine if any changes need to be made to rule 1002 being authored.

In certain implementations, when selecting candidate URLs from which example matched URLs are identified, PMS 102 looks at URLs in data received for the customer in a particular time period. For example, the time period may be the last "X" minutes (or hours, or days, or months, etc.). The time period may be measured from the time the processing for identifying matching URLs is performed. In the embodiment depicted in FIG. 10, PMS 102 has identified the shown example matched URLs displayed in window 1006 by looking at the last 5 mins of customer data. This is indicated in the title of window 1006 that states "Example Matched URLs (last 5 mins)." In order to identify these URLs, PMS 102 may look at URLs-associated data received for the customer and having associated time stamps that fall within the last 5 mins from the time when processing for rules matching is performed for identifying the example matched URLs. Since this time window keeps changing and is a sliding time window, the URLs displayed in window 1006 may get automatically and dynamically updated with passage of time.

Figure 11:
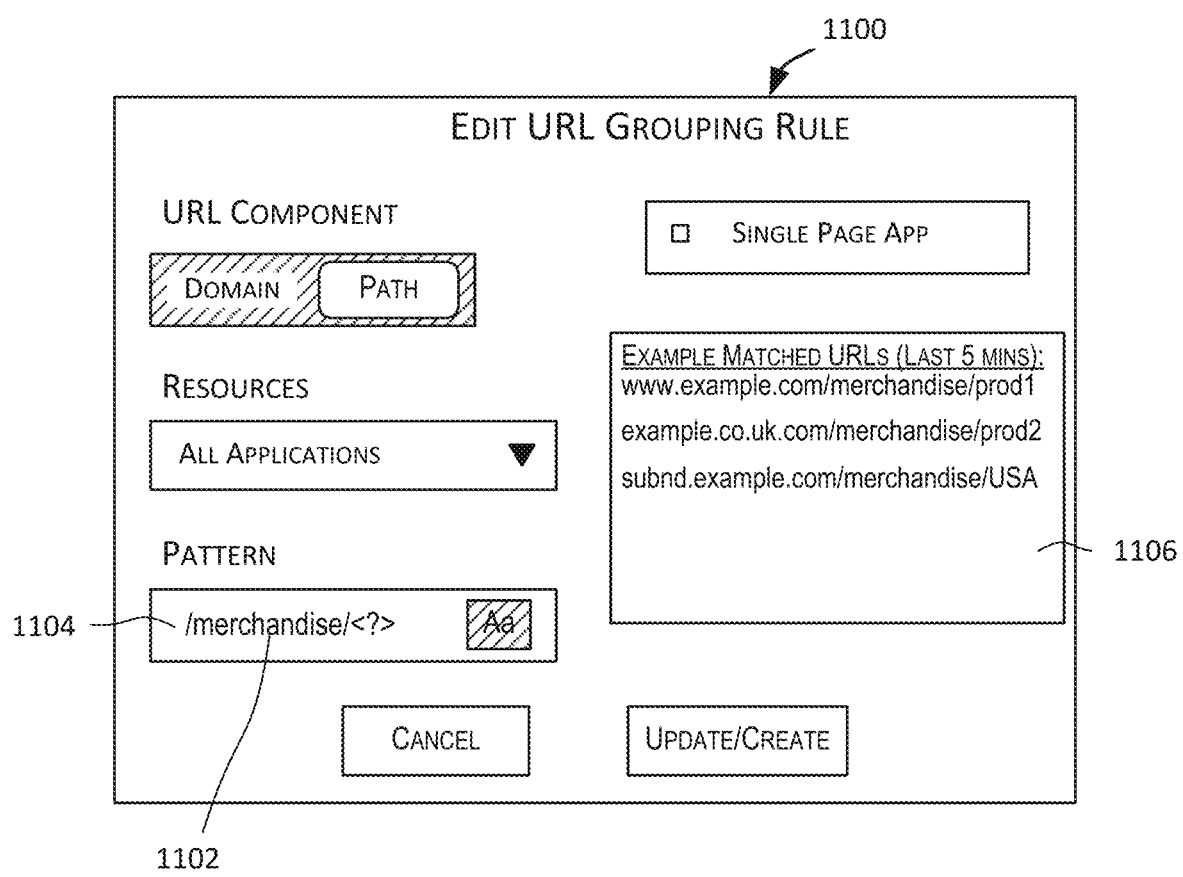
FIG. 11 depicts another example of a GUI that displays a window showing example matched URLs for a URL grouping rule as the URL grouping rule is being authored according to certain embodiments.

FIG. 11 depicts another example of a GUI 1100 that displays a window showing example matched URLs for a URL grouping rule as the URL grouping rule is being authored according to certain embodiments. GUI 1100 is similar to GUI depicted in FIG. 4A and FIG. 6. In FIG. 11, the user has selected the path component. The user has additionally entered a path component rule 1102 ("/merchandise/<?>") in field 1104, where rule 1102 is directed to the path component of a URL. A window 1106 is displayed showing example matched URLs that match rule "/merchandise/<?>" 1102. The user authoring rule 1102 is thus provided instant feedback regarding the URLs that match rule 1102. Based upon the URLs displayed in window 1106, the user can determine if any changes need to be made to rule 1102. As described above, the URLs displayed in window 1106 may get automatically and dynamically updated with passage of time as the time window changes and the data that is used by PMS 102 to find the example matched URLs changes.

Figure 12:
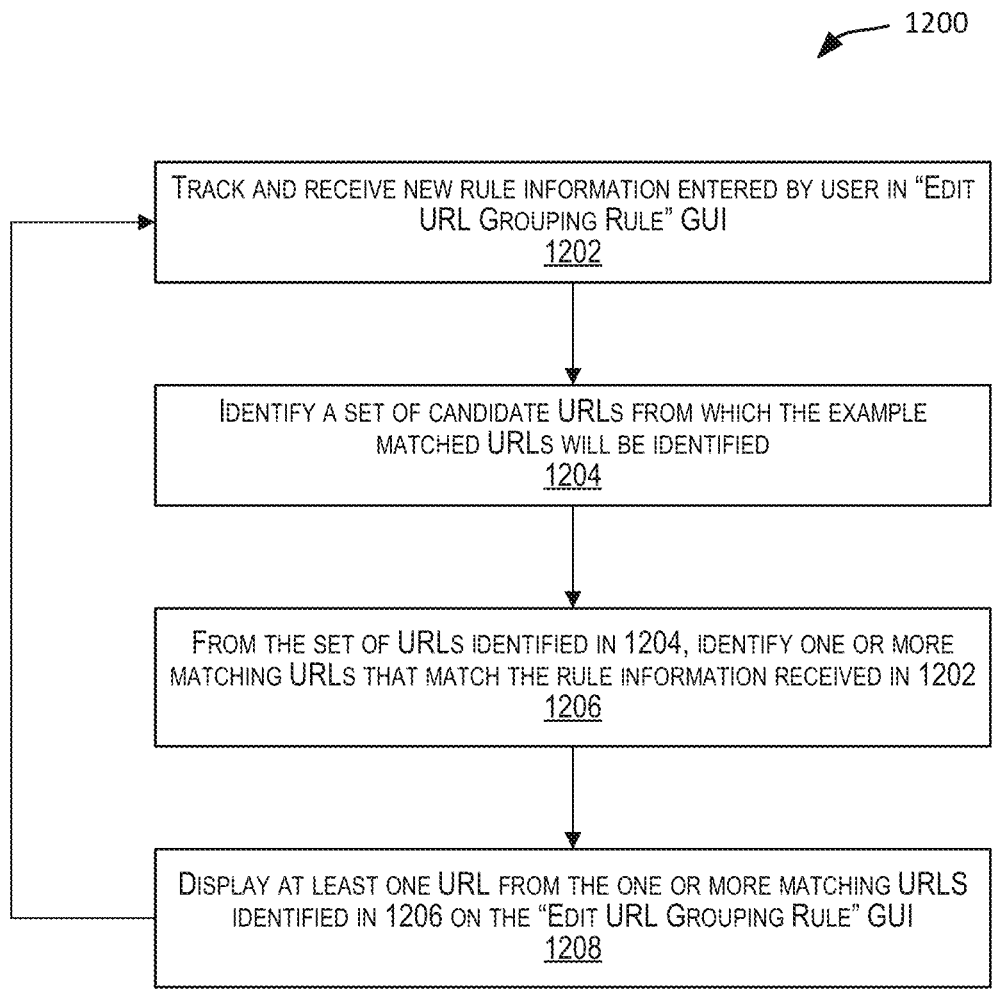
FIG. 12 depicts a simplified flowchart showing processing performed by a PMS for identifying and displaying example matched URLs for a URL grouping rule as a user is authoring the URL grouping rule according to certain embodiments.

FIG. 12 depicts a simplified flowchart 1200 showing processing performed by a PMS for identifying and displaying example matched URLs for a URL grouping rule as a user is authoring the URL grouping rule according to certain embodiments. The processing depicted in FIG. 12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the processing may be performed in some different order, or some steps may also be performed in parallel. In the embodiment depicted in FIG. 1, the processing depicted in FIG. 12 may be performed by PMS 102, or more specifically by UGS 106.

The processing depicted in FIG. 12 may be triggered when the "Edit URL Grouping Rule" GUI (e.g., GUIs 1000 or 1100) is displayed to a user wanting to create a new URL grouping rule. Initially, when there is nothing entered in fields 1004 or 1104, windows 1006 and 1106 will be blank or empty. As the user starts entering a rule in fields 1004 or 1104, PMS 102 tracks what is entered in the fields, identifies the example matched URLs, and causes the example matched URLs to be displayed in windows 1006 and 1106 based upon the current entry in fields 1004 and 1104, respectively. Accordingly, as shown in FIG. 11, processing starts at 1202, when the new rule information entered by a user in the "Edit URL Grouping Rule" GUI is tracked and received by PMS 102.

At 1204, PMS 102 identifies a set of candidate URLs from which the example matched URLs will be identified. For this example, if the user authoring the URL grouping rule is affiliated with a customer "CompanyA" of PMS 102, PMS 102 may access the ingested URLs-associated data 114 received by PMS 102 for that customer. The set of candidate URLs identified in 1204 may correspond to URLs occurring in the URLs-associated data accessed by PMS 102 for CompanyA.

In certain implementations, as part of the processing in 1204, PMS 102 may access URLs-associated data received for the customer with a time stamp within a particular time period. For example, the time period may be the last "X" minutes (or hours, or days, or months, etc.). The time period may be measured from the time of performing the processing shown in FIG. 12. The time period may thus be measured relative to the current time or the time of performing the processing depicted in FIG. 12. For example, if the processing in FIG. 12 is performed at time "T1", then the portion of ingested data 114 that is processed to identify the list of candidate URLs is data occurring in the time period (T1−X) (e.g., ingested data points with a an associated time stamp occurring in the time period (T1−X). For the examples shown in FIGS. 10 and 11, the "X" is the last 5 minutes. PMS 102 then identifies all URLs occurring in the customer data received in the last 5 minutes as candidate URLs for identifying the example matched URLs. If the rule being authored has any restrictions with respect to the applications to which the rule can be applied, then URLs associated with applications not within the scope of the rule are filtered out. The remaining URLs represent the set of candidate URLs determined in 1204 from which one or more example matched URLs are identified.

In some other implementations, PMS 102 may store a cache of URLs received for the customer in the last "X" time period. In such an implementation, the URLs in this cache represent the initial set of candidate URLs. If the rule being authored has any restrictions with respect to the applications to which the rule can be applied, then URLs in the cache associated with applications not within the scope of the rule are filtered out. The remaining URLs represent the set of candidate URLs determined in 1204 from which one or more example matched URLs are identified.

At 1206, from the set of candidate URLs identified in 1204, PMS 102 identifies those URLs that match the pattern corresponding to the URL grouping rule determined in 1202. In certain implementations, the matching of a candidate URL to the URL grouping rule may be performed per the processing depicted in FIG. 9 and described above.

In certain implementations, the pattern identified by a URL grouping rule may be applied directly to the ingested data for a customer, where the ingested data contains data identifying multiple URLs associated with the customer, to find a set of matched URLs that match the pattern corresponding to the URL grouping rule. In such an embodiment, a separate step for identifying a list of candidate URLs, as in 1204, may not be needed.

At 1208, one or more of the matching URLs identified in 1206 are displayed via a GUI (e.g., via window 1006 in FIG. 10 or window 1106 in FIG. 11) as example matched URLs.

In certain implementations, all the matched URLs identified in 1206 are displayed as example matched URLs via the GUI. In other embodiments, due to size limitations of the GUI displaying the example matched URLs, the number of example matched URLs that can be displayed in the GUI may be limited to some threshold number "N". If the number of matching URLs identified in 1206 is more than this threshold number, then the "N" most recent matching URLs (e.g., having the most recent associated time stamps) may be displayed from the matching URLs identified in 1206. In this scenario, not all URLs from the set of example matched URLs are displayed, i.e., the set of example matched URLs identified in 1206 includes at least one URL that is not displayed in 1208.

Processing may continue with 1202 to track any changes made to the URL grouping rule being authored by the user, and the processing depicted in FIG. 12 may be repeated for the new state of the rule. In this manner, as the user continues to type in field 1004 of GUI 1000 and the URL grouping rule entered in field 1004 changes, the example matched URLs that are displayed in window 1106 are also dynamically changed to reflect the most recent state of the rule entered in field 1004. For example, if the URL grouping rule changes from a first URL grouping rule to a second URL grouping rule, the processing depicted in FIG. 12 is repeated for the new URL grouping rule. For example, a user may update the rule entered in field 1004 of GUI 1000 from "<?>.example.com" (shown in FIG. 10) to "<?>.example.<?>". This may result in a new set of candidate URLs being identified in 1204, and further a new set of example matched URLs being identified in 1206. One or more of matched URLs from the newly identified matched URLs may then be displayed. The previously displayed example matched URLs may be replaced on the GUI with the newly matched URLs. In this manner, the example matched URLs that are displayed by the GUI are dynamically and automatically changed in response to changes to the URL grouping rule being authored.

The example matched URLs that are displayed by the GUI may also change with passage of time. As previously described, in certain embodiments, a certain time period relative to the current time or the time of performing the processing depicted in FIG. 12 may be used to determine a portion of ingested data 114 that is to be processed to identify a list of candidate URLs occurring in that portion of the ingested data. For example, if the processing in FIG. 12 is performed at time "T1", then the portion of ingested data 114 that is processed to identify the list of candidate URLs is data occurring in the time period (T1−X), where X is some time period measured in minutes (e.g., 5 minutes), hours, days, weeks, etc. With the passage of time, T1 changes to T2 that occurs after T1. Now, the portion of ingested data that is processed to identify the list of candidate URLs is data occurring in the time period (T2−X) (e.g., ingested data points with an associated time stamp occurring in the time period (T2−X). Since the portion of the ingested data corresponding to (T2−X) can be different from the portion of ingested data occurring in (T1−X), the list of candidate URLs that are identified from this ingested data may change, and consequently the example matched URLs that are identified from the candidate list may also change. The example matched URLs displayed in window 1006 of GUI 1000 may be dynamically updated to display the example matched URLs from the new changed set of example matched URLs. The previously displayed example matched URLs displayed in window 1006 corresponding to time period (T1−X) may be dynamically replaced with a new set of example matched URLs corresponding to time period (T2−X). This also applies to the cache implementation, where the cached URLs can change over time.

Figure 13:
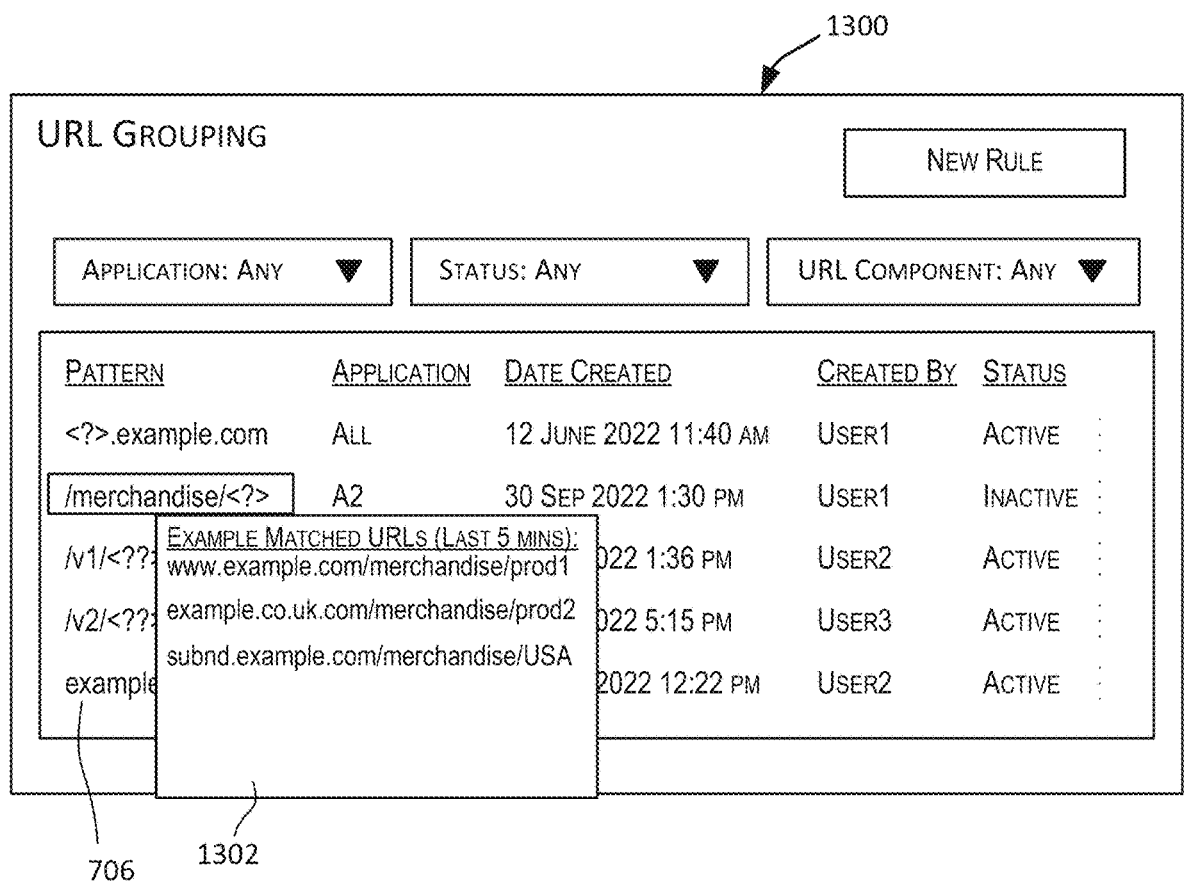
FIG. 13 depicts another use case where example matched URLs may be displayed via a GUI according to certain embodiments.

FIG. 13 depicts another use case where example matched URLs may be displayed via a GUI according to certain embodiments. FIG. 13 depicts the "URL Grouping" GUI 700 previously depicted in FIG. 7. GUI 700 lists information for a list of URL grouping rules 706 configured for a customer of PMS 102. The user may select a particular URL grouping rule and example matched URLs for that selected particular rule are displayed, such as in window 1302 depicted in FIG. 13. For example, the user may hover using a mouse pointer over a particular rule (or right click on the rule, etc.) and window 1302 may be invoked displaying example matched URLs that match the selected rule. In certain implementations, window 1302 may continue to be displayed while the user hovers over the URL grouping rule with a mouse and may be removed from being displayed when the hovering no longer occurs.

Figure 14:
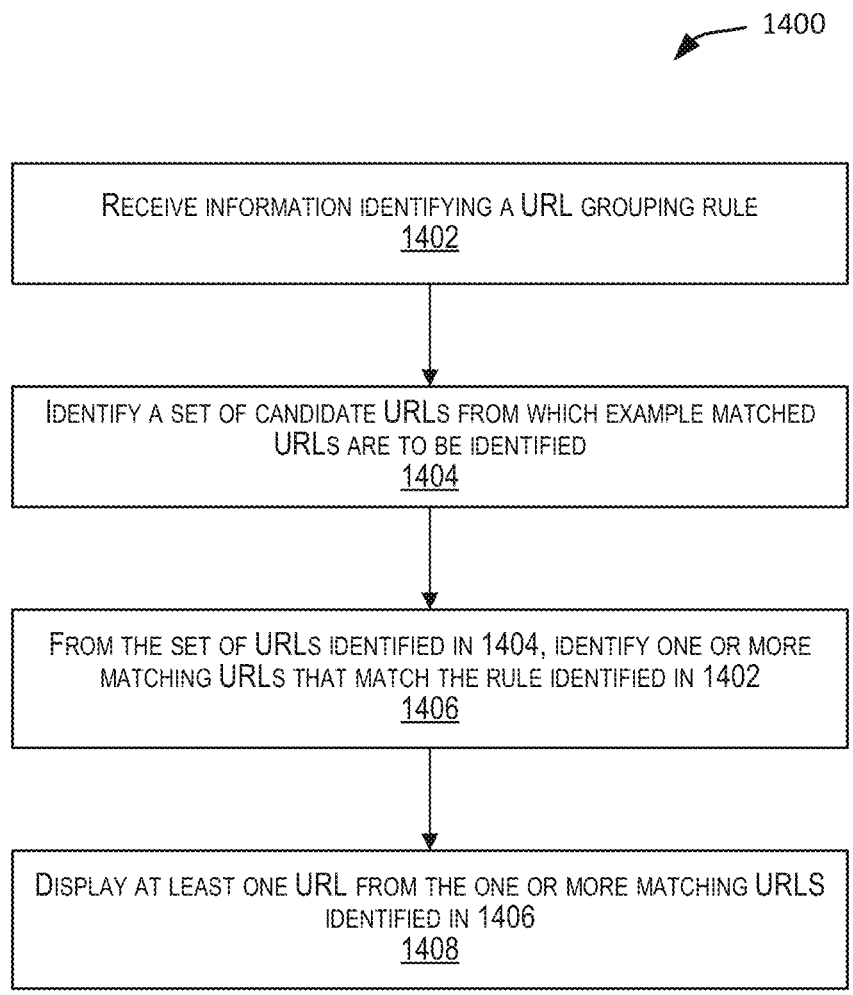
FIG. 14 depicts a simplified flowchart showing another example of processing performed by a PMS for identifying and displaying example matched URLs for a URL grouping rule according to certain embodiments.

FIG. 14 depicts a simplified flowchart 1400 showing another example of processing performed by a PMS for identifying and displaying example matched URLs for a URL grouping rule according to certain embodiments. The processing depicted in FIG. 14 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 14 and described below is intended to be illustrative and non-limiting. Although FIG. 14 depicts the various processing steps occurring in a particular sequence or order, this is not intended to be limiting. In certain alternative embodiments, the processing may be performed in some different order, or some steps may also be performed in parallel. In the embodiment depicted in FIG. 1, the processing depicted in FIG. 14 may be performed by PMS 102, or more specifically by UGS 106.

At 1402, information is received identifying a URL grouping rule for which example matched URLs are to be identified and displayed. The URL grouping rule may be displayed on a GUI. For example, the URL grouping rule may be entered in field 1104 and displayed by GUI 1100. As another example, the URL grouping rule may be displayed on a GUI, such as on GUI 1300 depicted in FIG. 13. At 1404, PMS 102 identifies a set of candidate URLs from which the example matched URLs will be identified. The URLs identified in 1404 may be those occurring in ingested data 114 in FIG. 1. In certain implementations, the processing performed in 1404 is substantially similar to the processing performed in 1204 in FIG. 12 and described above. At 1406, from the set of candidate URLs identified in 1404, PMS 102 identifies those URLs that match the pattern corresponding to the URL grouping rule identified in 1402. In certain implementations, the processing performed in 1406 is substantially similar to the processing performed in 1206 in FIG. 12 and described above. At 1408, at least one URL from the matching URLs identified in 1406 is displayed via a GUI (e.g., via window 1006 in FIG. 10 or window 1106 in FIG. 11) as an example matched URL.

As previously described with respect to FIG. 12, with passage of time, the portion of ingested data from which the list of candidate URLs is identified can change. As a result, the example matched URLs, which are identified from the list of candidate URLs, can also change. The one or more matched URLs displayed in 1408 may be dynamically updated to display the new changed example matched URLs instead of the previously displayed example matched URLs.

Various examples and implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   causing, by a performance monitoring system, a graphical user interface (GUI) to be displayed on an output device, the GUI including a first user interface element that is configured to receive information identifying a first Uniform Resource Locator (URL) grouping rule;
   identifying, by the performance monitoring system, a first list of candidate URLs occurring in a stored data;
   identifying, from the first list of candidate URLs, a first set of matched URLs, the first set of matched URLs including one or more URLs from the first list of candidate URLs that matched the first URL grouping rule;
   causing, by the performance monitoring system, at least one URL from the first set of matched URLs to be displayed on the GUI;
   determining, by the performance monitoring system that the first URL grouping rule is changed to second URL grouping rule;
   identifying, by the performance monitoring system, a second set of matched URLs from a second list of candidate URLs that matched the second URL grouping rule; and
   causing at least one URL from the second set of matched URLs to be displayed on the GUI instead of the at least one URL from the first set of matched URL.

2. The method of claim 1 wherein the stored data is a cached list of URLs.

3. The method of claim 1 wherein the stored data is data ingested by the performance monitoring system, the ingested data comprising data associated with a plurality of URLs.

4. The method of claim 1 wherein identifying the first list of candidate URLs comprises:
   identifying a first portion of the stored data occurring in a first time period; and
   identifying the first list of candidate URLs from the first portion of the stored data.

5. The method of claim 4 further comprising:
   after causing the at least one URL from the first set of matched URLs to be displayed on the GUI:
   identifying the second list of candidate URLs occurring in a second portion of the stored data occurring in a second time period, wherein the second time period is different from the first time period; and
   identifying, from the second list of candidate URLs, the second set of matched URLs, the second set of matched URLs including one or more URLs from the second list of candidate URLs that matched the first URL grouping rule.

6. The method of claim 1 wherein the first URL grouping rule is entered in a field of a GUI that enables creation of URL grouping rules.

7. The method of claim 1 wherein the GUI displays a list of URL grouping rules, the list of URL grouping rules including the first URL grouping rule.

8. The method of claim 1 wherein causing at least one URL from the first set of matched URLs to be displayed on the GUI comprises displaying all URLs in the first set of matched URLs.

9. The method of claim 1 wherein causing at least one URL from the first set of matched URLs to be displayed on the GUI comprises:
   selecting one or more URLs from the first set of matched URLs, where the first set of matched URLs includes at least one URL that is not included in the selected one or more URLs; and
   displaying the one or more URLs on the GUI.

10. A non-transitory computer-readable medium having stored thereon instructions that, when executed by one or more processors, cause the one or more processors to perform operations including:
    causing, by a performance monitoring system, a graphical user interface (GUI) to be displayed on an output device, the GUI including a first user interface element that is configured to receive information identifying a first Uniform Resource Locator (URL) grouping rule;
    identifying, by the performance monitoring system, a first list of candidate URLs occurring in a stored data;
    identifying, from the first list of candidate URLs, a first set of matched URLs, the first set of matched URLs including one or more URLs from the first list of candidate URLs that matched the first URL grouping rule;

causing, by the performance monitoring system, at least one URL from the first set of matched URLs to be displayed on the GUI;

determining, by the performance monitoring system that the first URL grouping rule is changed to second URL grouping rule;

identifying, by the performance monitoring system, a second set of matched URLs from a second list of candidate URLs that matched the second URL grouping rule; and causing at least one URL from the second set of matched URLs to be displayed on the GUI instead of the at least one URL from the first set of matched URL.

11. The non-transitory computer-readable medium of claim 10 wherein identifying the first list of candidate URLs comprises:

identifying a first portion of the stored data occurring in a first time period; and identifying the first list of candidate URLs from the first portion of the stored data.

12. The non-transitory computer-readable medium of claim 11 wherein the operations further include:

after causing the at least one URL from the first set of matched URLs to be displayed on the GUI:

identifying the second list of candidate URLs occurring in a second portion of the stored data occurring in a second time period, wherein the second time period is different from the first time period; and identifying, from the second list of candidate URLs, the second set of matched URLs, the second set of matched URLs including one or more URLs from the second list of candidate URLs that matched the first URL grouping rule; and causing at least one URL from the second set of matched URLs to be displayed on the GUI instead of the at least one URL from the first set of matched URLs.

13. The non-transitory computer-readable medium of claim 10 wherein the first URL grouping rule is entered in a field of a GUI that enables creation of URL grouping rules.

14. The non-transitory computer-readable medium of claim 10 wherein the GUI displays a list of URL grouping rules, the list of URL grouping rules including the first URL grouping rule.

15. The non-transitory computer-readable medium of claim 10 wherein causing at least one URL from the first set of matched URLs to be displayed on the GUI comprises:

displaying all URLs in the first set of matched URLs; or selecting one or more URLs from the first set of matched URLs, where the first set of matched URLs includes at least one URL that is not included in the selected one or more URLs, and displaying the one or more URLs on the GUI.

16. A system comprising:

one or more processors; and a non-transitory computer-readable medium having stored thereon instructions that, when executed by the one or more processors, cause the one or more processors to perform operations including:

causing a graphical user interface (GUI) to be displayed on an output device, the GUI including a first user interface element that is configured to receive information identifying a first Uniform Resource Locator (URL) grouping rule;

identifying a first list of candidate URLs occurring in a stored data;

identifying, from the first list of candidate URLs, a first set of matched URLs, the first set of matched URLs including one or more URLs from the first list of candidate URLs that matched the first URL grouping rule;

causing at least one URL from the first set of matched URLs to be displayed on the GUI;

determining that the first URL grouping rule is changed to second URL grouping rule;

identifying a second set of matched URLs from a second list of candidate URLs that matched the second URL grouping rule; and causing at least one URL from the second set of matched URLs to be displayed on the GUI instead of the at least one URL from the first set of matched URL.

17. The system of claim 16 wherein:

identifying the first list of candidate URLs comprises:

identifying a first portion of the stored data occurring in a first time period; and identifying the first list of candidate URLs from the first portion of the stored data; and the operations further include:

after causing the at least one URL from the first set of matched URLs to be displayed on the GUI:

identifying a second list of candidate URLs occurring in a second portion of the stored data occurring in a second time period, wherein the second time period is different from the first time period;

identifying, from the second list of candidate URLs, a second set of matched URLs, the second set of matched URLs including one or more URLs from the second list of candidate URLs that matched the first URL grouping rule; and causing at least one URL from the second set of matched URLs to be displayed on the GUI instead of the at least one URL from the first set of matched URLs.

* * * * *